US012387566B2

(12) United States Patent
Bennett

(10) Patent No.: US 12,387,566 B2
(45) Date of Patent: Aug. 12, 2025

(54) GAMING DEVICE WITH FILLABLE SYMBOL POSITION PATTERN

(71) Applicant: Aristocrat Technologies Australia Pty Limited, North Ryde (AU)

(72) Inventor: Nicholas Bennett, Manly Vale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 339 days.

(21) Appl. No.: 18/152,081

(22) Filed: Jan. 9, 2023

(65) Prior Publication Data

US 2024/0046761 A1 Feb. 8, 2024

(30) Foreign Application Priority Data

Aug. 5, 2022 (AU) ................................ 2022211905

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ...... G07F 17/32; G07F 17/34; G07F 17/3213; G07F 17/3267
See application file for complete search history.

(56) References Cited

U.S. PATENT DOCUMENTS

2002/0068623 A1* 6/2002 Gauselmann ....... G07F 17/3265 463/20
2003/0216165 A1* 11/2003 Singer ................. G07F 17/3211 463/20
2005/0049031 A1* 3/2005 Jackson .................. G07F 17/34 463/20
2007/0232381 A1* 10/2007 Sato ........................ G07F 17/34 463/20
2008/0274786 A1* 11/2008 Wilson ................ G07F 17/3244 463/20
2009/0069080 A1* 3/2009 Pires ................... G07F 17/3244 463/26
2009/0124364 A1* 5/2009 Cuddy .................... G07F 17/32 463/31
2009/0131154 A1* 5/2009 Chim ...................... G07F 17/32 463/25
2011/0028201 A1* 2/2011 Warner ................... G07F 17/34 463/19

(Continued)

*Primary Examiner* — Steve Rowland
(74) *Attorney, Agent, or Firm* — Blank Rome LLP

(57) ABSTRACT

A technique for using symbol position patterns includes performing a selection operation, using the random number generator and a data structure comprising a plurality of symbol position patterns to obtain one of the symbol position patterns, and modifying display of the plurality of symbol positions in accordance with the selected symbol position pattern. A symbol selection instance is performed using a lookup table comprising a plurality of reel strips, wherein the reel strips include a designated symbol with respect to the plurality of symbol positions until an end condition is met, and upon all the symbol positions of the selected symbol position pattern being occupied by the designated symbol when the end condition is met, an outcome is determined.

16 Claims, 26 Drawing Sheets

(56) References Cited

U.S. PATENT DOCUMENTS

| | | | | |
|---|---|---|---|---|
| 2013/0102377 | A1* | 4/2013 | Ballone | G07F 17/3267 463/20 |
| 2013/0217477 | A1* | 8/2013 | Wright | G07F 17/3274 463/25 |
| 2014/0087858 | A1* | 3/2014 | Cuddy | G07F 17/32 463/27 |
| 2014/0228092 | A1* | 8/2014 | Inamura | G07F 17/3267 463/20 |
| 2014/0357342 | A1* | 12/2014 | Elias | G07F 17/3262 463/20 |
| 2016/0086429 | A1* | 3/2016 | Inamura | G07F 17/326 463/20 |
| 2017/0092041 | A1* | 3/2017 | Kudo | G07F 17/3267 |
| 2018/0122184 | A1* | 5/2018 | Wortmann | G07F 17/3213 |
| 2018/0130298 | A1* | 5/2018 | Koshorek | G07F 17/3213 |
| 2019/0088088 | A1* | 3/2019 | Foster | G07F 17/3267 |
| 2021/0295639 | A1* | 9/2021 | Matos | G07F 17/3267 |

* cited by examiner

300

| | 341 | 342 | 343 | 344 | 345 |
|---|---|---|---|---|---|
| | Reel Strip 1 | Reel Strip 2 | Reel Strip 3 | Reel Strip 4 | Reel Strip 5 |
| 301 | A | 10 | Q | 10 | PIC1 |
| 302 | PIC3 | J | K | PIC2 | SCAT |
| 303 | PIC3 | Q | 9 | PIC3 | PIC3 |
| 304 | PIC2 | PIC4 | PIC2 | 9 | Q |
| 305 | K | A | PIC1 | Q | A |
| 306 | SCAT | SCAT | 10 | A | Q |
| 307 | PIC3 | PIC1 | K | A | Q |
| 308 | A | J | WILD | 10 | WILD |
| 309 | J | Q | J | PIC2 | K |
| 310 | 10 | K | PIC3 | K | 9 |
| 311 | A | 9 | Q | PIC1 | PIC4 |
| 312 | PIC3 | K | PIC3 | SCAT | 10 |
| 313 | 10 | 10 | SCAT | A | 10 |
| 314 | SCAT | SCAT | Q | J | Q |
| 315 | K | WILD | Q | 10 | A |
| 316 | PIC1 | J | 10 | A | 10 |
| 317 | J | J | A | PIC4 | K |
| 318 | Q | A | SCAT | 9 | A |
| 319 | PIC4 | PIC2 | PIC2 | 9 | J |
| 320 | A | PIC3 | Q | PIC2 | PIC3 |
| 321 | PIC1 | 9 | A | PIC1 | PIC4 |
| 321 | A | PIC3 | J | WILD | 10 |
| 323 | J | K | J | PIC3 | J |
| 324 | Q | Q | PIC4 | Q | Q |
| 325 | PIC2 | Q | 9 | A | PIC3 |
| 330 | ... | ... | ... | ... | ... |

*FIG. 3*

FIG. 6
600
630
641
642
660
LUNAR
$50
GIANT
$5,000.74
STELLAR
DWARF
$25
3 OR MORE
WIN AWARDS EITHER
WIN AWARDS
STAR SIGN
COLLECT AND CLONE!
FEATURE
COSMIC CLIMB
MORE WILDS + MULTIPLIERS
UFO
5 LUCKY PICKS!
MARTIAN MILLIONS
720 WAYS
CREDIT 22275
BET 60
WIN 0
621
622
623
624
625
651
652
653

FIG. 7
700
GIANT
$5,000.24
STELLAR
$500.88
$50
$75
3 OR MORE
WIN AWARDS EITHER
STAR SIGN
COLLECT AND CLONE!
COSMIC CLIMB
MORE WILDS + MULTIPLIERS
FEATURE
3 OR MORE
WIN AWARDS
UFO
5 LUCKY PICKS!
FEATURE
5 300
4 150
3 100
2 50
1 10
5 250
4 150
3 50
2 25
1 10
5 200
4 125
3 30
2 15
5 175
4 100
3 30
2 15
5 150
4 75
3 25
2 15
SUBSTITUTES
STAR SIGN
FEATURE
Bet multiplier 1 - Total cost 60 credits
CREDIT 22275
BET 60
WIN 0
710

FIG. 8
GIANT
STELLAR
$50
$5,000.74
$500.88
$25
3 OR MORE WIN AWARDS EITHER
3 OR MORE WIN AWARDS
STAR SIGN
COLLECT AND CLONE!
FEATURE
COSMIC CLIMB
MORE WILDS + MULTIPLIERS
FEATURE
UFO
5 LUCKY PICKS!
FEATURE
5 300
4 150
3 100
2 50
1 10
5 250
4 150
3 50
2 25
1 10
5 200
4 125
3 30
2 15
5 175
4 100
3 30
2 15
5 150
4 75
3 25
2 15
SUBSTITUTES
MARTIAN
MILLIONS
FREE GAME 0 OF 18
720 WAYS
YOU WON THE
COSMIC CLIMB
FEATURE
PRESS PLAY
TO START FEATURE
CREDIT 22275
BET 60
WIN 75

FIG. 14
1400
GIANT
$5,000.74
STELLAR
$500.90
LUNAR
BONUS
$50
DWARF
BONUS
$75
Fill in all with to win a
PROGRESSIVE or BONUS!
MARTIAN
MILLIONS
FREE SPINS 2
FREE SPINS 2
CREDIT 24370
BET 60
WIN 125
1241A
1451
1351
1431
1432

FIG. 15
GIANT
$5,000.74
STELLAR
$500.90
LUNAR
BONUS
DWARF
BONUS
$25
Fill in all with to win a
PROGRESSIVE or BONUS!
MARTIAN
MILLIONS
FREE SPINS
FREE SPINS
CREDIT 24370
BET 60
WIN 125

FIG. 16
1600
GIANT
$5,000.24
STELLAR
$500.90
LUNAR
BONUS
$50
DWARF
BONUS
$75
Fill in all with to win a
PROGRESSIVE or BONUS!
MARTIAN MILLIONS
FREE SPINS 2
FREE SPINS 2
CREDIT 24370
BET 60
WIN 125
621
622
623
624
625
1241A

FIG. 19
LUNAR
$50
GIANT
$5,000.74
STELLAR
$500.00
DWARF
$25
3 OR MORE WIN AWARDS EITHER
STAR SIGN
COLLECT AND CLONE!
FEATURE
COSMIC CLIMB
MORE WILDS + MULTIPLIERS
FEATURE
3 OR MORE WIN AWARDS
UFO
5 LUCKY PICKS!
FEATURE
5 300
4 150
3 100
2 50
1 10
5 250
4 150
3 50
2 25
1 10
5 200
4 125
3 30
2 15
5 175
4 100
3 30
2 15
5 150
4 75
3 25
2 15
SUBSTITUTES
MARTIAN MILLIONS
FREE GAME 1 OF 5
720 WAYS
CREDIT 24370
BET 60
WIN 50215

FIG. 20
2000
LUNAR
$50
GIANT
$5,000.24
STELLAR
$500.00
DWARF
$75
3 OR MORE WIN AWARDS EITHER
STAR SIGN
COLLECT AND CLONE!
FEATURE
COSMIC CLIMB
MORE WILDS + MULTIPLIERS
FEATURE
3 OR MORE WIN AWARDS
UFO
5 LUCKY PICKS!
FEATURE
MILLIONS
5 300
4 150
3 100
2 50
1 10
5 250
4 150
3 50
2 25
1 10
5 200
4 125
3 30
2 15
5 175
4 100
3 30
2 15
5 150
4 75
3 25
2 15
SUBSTITUTES
MARTIAN MILLIONS
10
FREE GAME 1 OF 5
720 WAYS
CREDIT 24370
BET 60
WIN 50215
1241B

GAMING DEVICE WITH FILLABLE SYMBOL POSITION PATTERN

FIELD OF THE INVENTION

The present application relates to a gaming device, a method of operating a gaming device and a system with a fillable symbol position pattern.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP = return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

There is disclosed a gaming device, a method of operating a gaming device and a system with a fillable symbol position pattern. A symbol position pattern is selected (for example, when a trigger condition is met) from a plurality of different symbol position patterns. Each symbol position pattern is a subset of the plurality of symbols positions for which symbols are selected during a game instance and the display is modified to indicate which of these symbol positions form part of the symbol position pattern. Symbol selection is then conducted using reel strips incorporating a designated symbol until an end condition is met. When the pattern is filled by designated symbols when the end condition is met, an award is made.

An example embodiment describes a gaming device comprising a display, a random number generator, at least one input mechanism, a processor, and a memory storing (i) symbol position data defining a plurality of symbol positions, (ii) a plurality of different symbol position patterns, each comprising a subset of the plurality of symbol positions, (iii) symbol data defining at least a plurality of reel strips comprising a designated symbol, and (iv) instructions. When the instructions are executed by the processor, they cause the processor to control the display to display the plurality of symbol positions defined by the symbol position data, select, using the random number generator, one of the symbol position patterns, modify display of the plurality of symbol positions to indicate the subset of the plurality of symbol positions of the selected symbol position pattern, conduct symbol selection, from the plurality of reel strips comprising a designated symbol, in respect of the plurality of symbol positions until an end condition is met, and upon all the symbol positions of the selected symbol position pattern being occupied by the designated symbol when the end condition is met, make an award.

Another example embodiment describes a method of operating a gaming device comprising a display, a random number generator, at least one input mechanism, a processor, and a memory storing (i) symbol position data defining a plurality of symbol positions, (ii) a plurality of different symbol position patterns, each comprising a subset of the plurality of symbol positions, and (iii) symbol data defining at least a plurality of reel strips comprising a designated symbol. The method comprises controlling the display to display the plurality of symbol positions defined by the symbol position data, selecting, using the random number generator, one of the symbol position patterns, modifying display of the plurality of symbol positions to indicate the subset of the plurality of symbol positions of the selected symbol position pattern, conducting symbol selection, from the plurality of reel strips comprising a designated symbol, in respect of the plurality of symbol positions until an end condition is met, and upon all the symbol positions of the selected symbol position pattern being occupied by the designated symbol when the end condition is met, making an award.

Another example embodiment describes a system comprising at least one display, a random number generator, at least one input mechanism, one or more processors, and a memory storing (i) symbol position data defining a plurality of symbol positions, (ii) a plurality of different symbol position patterns, each comprising a subset of the plurality of symbol positions, (iii) symbol data defining at least a plurality of reel strips comprising a designated symbol, and (iv) instructions. When the instructions are executed by the one or more processors, they cause the one or more processors to control the at least one display to display the plurality of symbol positions defined by the symbol position data, select, using the random number generator, one of the symbol position patterns, modify display of the plurality of symbol positions to indicate the subset of the plurality of symbol positions of the selected symbol position pattern, conduct symbol selection, from the plurality of reel strips comprising a designated symbol, in respect of the plurality of symbol positions until an end condition is met, and upon all the symbol positions of the selected symbol position pattern being occupied by the designated symbol when the end condition is met, make an award.

BRIEF DESCRIPTION OF THE DRAWINGS

FIG. 3 illustrates an example reel strip layout.

DETAILED DESCRIPTION

Embodiments described herein are generally related to a technique for employing dynamic symbol position patterns which affect the outcome of a game. In particular, embodiments described herein are directed to randomly selecting a symbol position pattern which directs the number and pattern of symbol positions to be used in a game. That is, a visual layout for symbol positions is selected. The particular layout selected thereby affects how outcomes are determined for the game.

Embodiments described herein provide a technical improvement by employing additional game variations without requiring significant memory or compute resources to handle the additional permutations. In particular, embodiments described herein employ a data structure having a plurality of symbol position patterns for random selection. As such, the data structure comprising the plurality of symbol position patterns may be used in conjunction with a data structure having symbols for selection.

Figure 1:
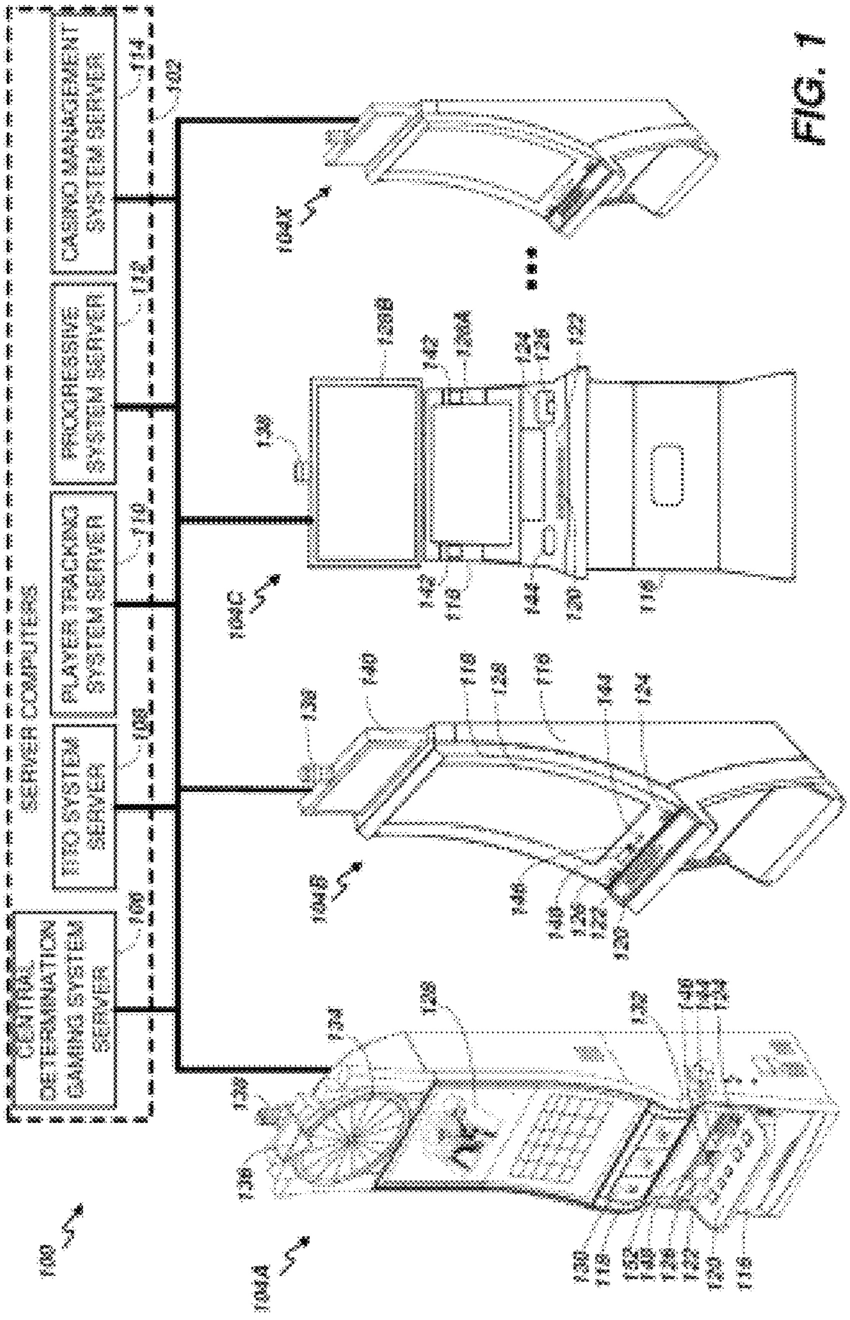
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5 of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
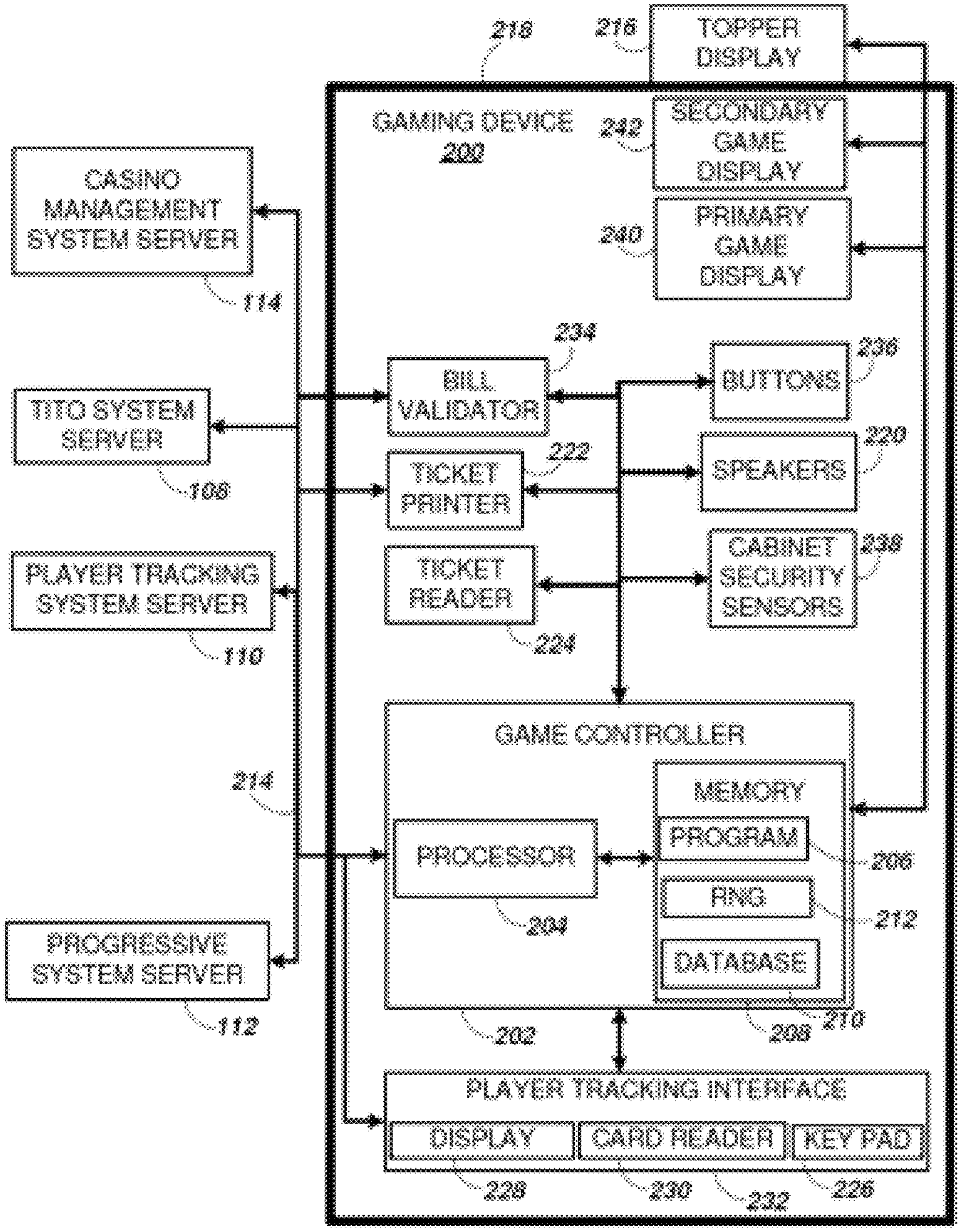
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 1046. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-1040 and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

The memory 208 may include one or more mass storage devices or media that are housed within gaming device 200. Memory 208 is defined herein as including volatile and nonvolatile memory and other types of non-transitory data storage components. Volatile memory is memory that do not retain data values upon loss of power. Nonvolatile memory is memory that do retain data upon a loss of power.

Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions, or computer readable code, and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the players level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

FIGS. 5A to 5D show a flow chart of an example embodiment of a method 500 of operating a gaming device 200. At step 502, the processor 204 receives a wager input by a player using an input mechanism, for example, a virtual button deck—that is a touch screen display that displays virtual buttons that the player can "press" by touching the virtual button deck where one of a plurality of buttons is displayed. In other examples, a physical button deck may be employed or a hybrid button deck having a mixture of virtual and physical buttons. The buttons may include a play button which allows the player to place the same wager placed in the previous game.

Figure 6:
FIGS. 6 to 17 are example screen displays resulting from operating the gaming device.

At step 504, the processor 204 controls the display 204 to display the symbol positions for which symbols will be selected. In an example, this step can be performed prior to receiving a wager, for example, by displaying the symbol positions occupied by symbols selected in a prior game instance. FIG. 6 is an example screen display 600, showing an example where nineteen symbol positions are arranged in five columns 621-625 of symbol positions with three symbol positions in the first column 621 and fifth column 625, four symbol positions in the second column 622 and fourth column 624, and five symbol positions in the third column 623. Other arrangements of symbol positions can be used in other embodiments including arrangements where there are the same number of symbol positions in each column.

At step 506, the processor 204 selects symbols by selecting stopping positions for a plurality of reel strips stored in one or more reel strip data structures in memory 208. FIG. 3 illustrates an example reel strip data structure having a set 300 of five reel strips 341, 342, 343, 344, 345. In the example, for illustrative purposes, twenty-five reel strip positions 301-325 are shown for each reel strip 341-345. In this example, each reel strip position of each reel has a symbol. In other examples, there may be one or more blank symbol positions. For example, a "Wild" symbol occupies the eight reel strip position 308 of the third reel strip 343. The symbols shown on the reel strips 341-345 are generally indicative of symbols that may be employed in the embodiments, however, other reels strips to those illustrated in FIG. 3 can be used. Symbol position 330 indicates that the reel strips 341-345 will typically have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

As shown in FIG. 3, in this example, each of the reel strips 341-345 has scatter symbols as indicated by the symbol "SCAT" (see, for example, the sixth position 306 of the first and second reel strips 341, 342. In some examples, scatter symbols are evaluated independently of the position at which they are selected by the processor 204. In other examples, they are evaluated in a defined order like other symbols, e.g. left to right from the leftmost column of symbol positions 621. While this example shows scatter symbols on each reel strip other examples may only have scatter symbols on some of the reel strips. For example, in a case where the scatter symbols also act as wild symbols, there may be no scatter symbols on a first reel strip.

It will be observed that the symbols include a number of "PIC" or picture symbols which represents that the symbols include a number of different symbols that have pictures/icons that fit the theme of the game. The number of different PIC symbols can vary depending on the composition of the pay table.

Figure 4:
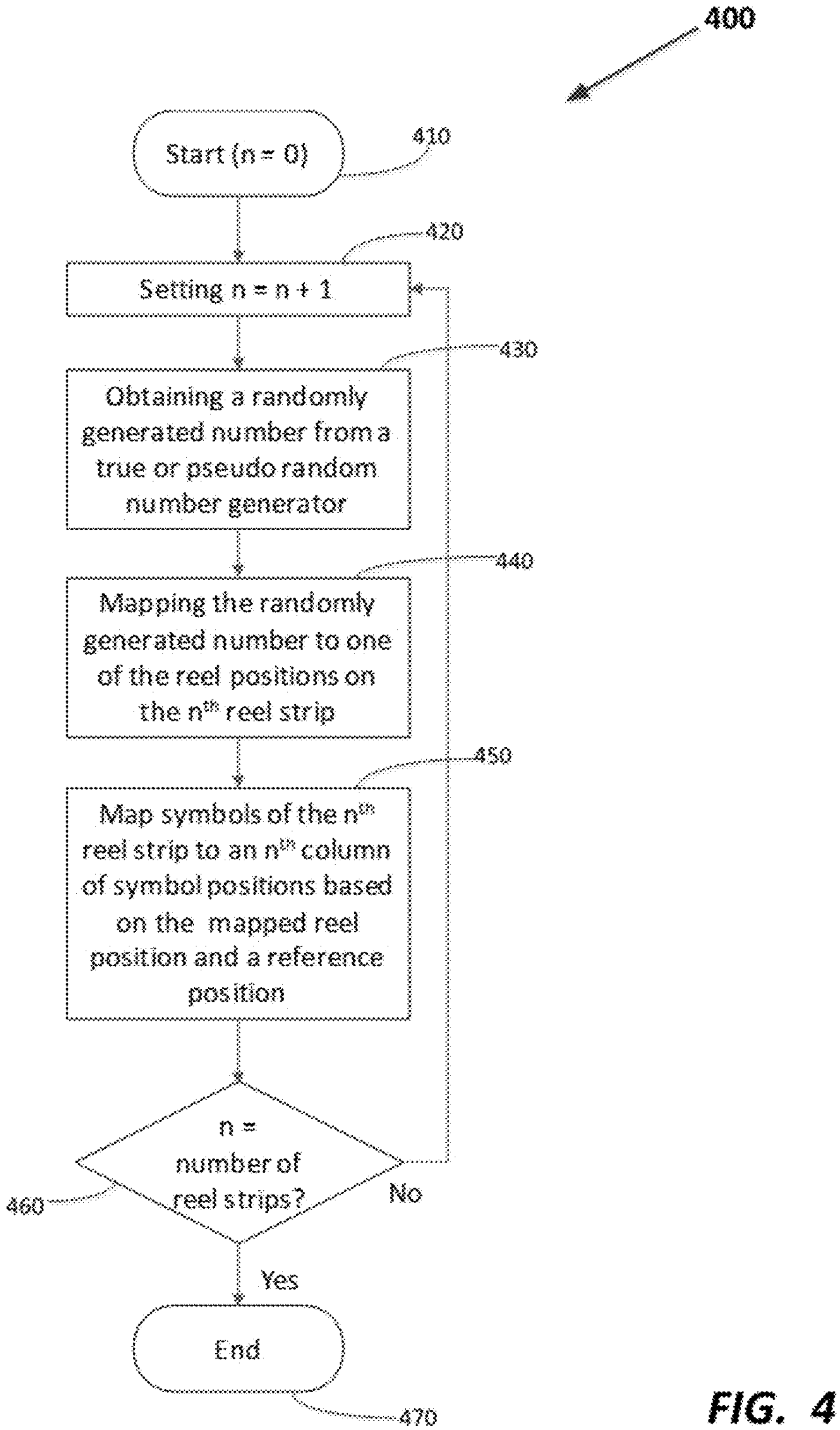
FIG. 4 is a flow chart of a symbol selection method.

FIG. 4 is a flow chart of an example method 400 carried out by the processor 204 to select symbols from reel strips 341-345 at step 504. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table in memory 208. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position or "stopping position" (and hence the symbol at this position) is mapped to the bottom symbol position of the column. Referring to the example reel strips of FIG. 3, if the value returned by the RNG 212 is mapped to reel position 313 when three symbols are being selected for the first column of symbol positions, then for the first reel strip 341, "10" is mapped to a bottom symbol position and the two symbols immediately above it (here "PIC3" and "A") will be mapped to the symbol positions above the symbol position while preserving the reel strip order of the first reel strip. In this example, the number of symbols mapped depends on the number of symbol positions in a respective column such that three symbols are mapped to the first and fifth columns 621, 625, four symbols are mapped to the second and fourth columns 622, 624, and five symbols are mapped to the third column 623.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470.

After the symbols of all reel strips have been mapped to symbol position, at step 508, the processor 204 controls display 240 to display the mapped symbols at the symbol positions, in this example by controlling the display 240 to animate the reel strips as spinning to the selected stopping positions.

At step 510, the processor 204 evaluates the displayed symbols based on a pay table stored in memory 208. In this example, a graphical pay table display 660 above the symbol entries graphically represents some of the entries in the pay table, in this example, the five largest winning outcomes. In this example, the processor 204 applies a ways to win evaluation where winning outcomes are evaluated from left to right, winning symbols can occur anywhere on the reel, and winning combinations are made up of no more than one symbol from each reel. In this example, there are 3×4×5×4×3=720 ways to win.

At step 512, the processor determines whether a feature trigger condition is met in respect of the game instance. In this example, each of the trigger condition involves the occurrence of a defined number of a relevant trigger symbols. In the example embodiment, there are three feature games that can be triggered, a symbol pattern feature (the 'Star Sign' feature game), an award path feature (the 'Cosmic Climb' feature), and a random prize award feature (the 'UFO') feature. The Star Sign and Cosmic Climb features share the same defined trigger symbol, in this example a scatter symbol in the form of a Planet symbol. The UFO feature has a separate defined symbol in the form of a UFO symbol.

Figure 7:
Figure 8:
Figure 9:
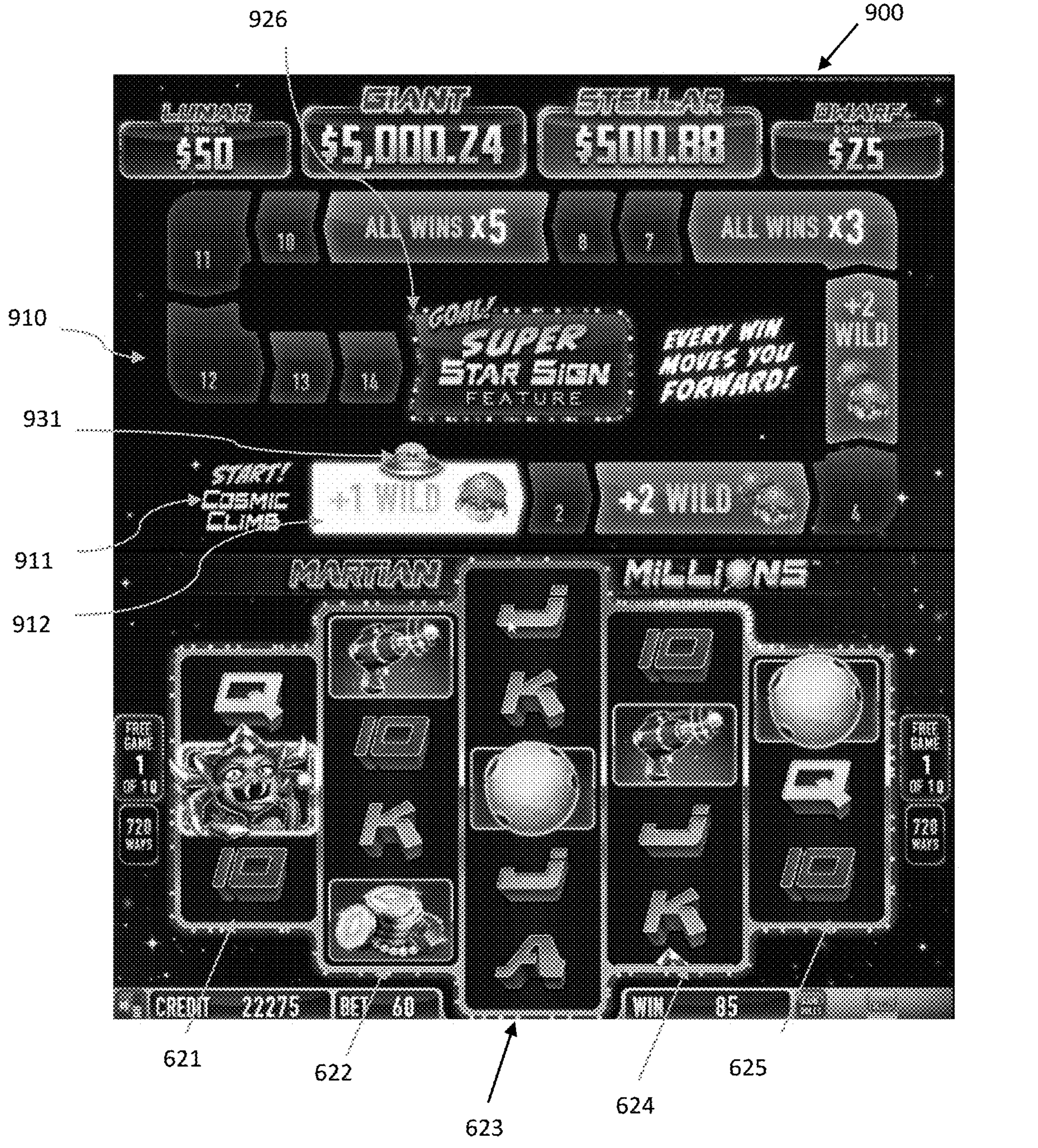

As indicated by feature game message 641, a "3 or more [Planet symbol] win awards either the Star Sign . . . Feature [or] Cosmic Climb . . . Feature". FIG. 6 shows an example of a 3 Planet win in the form of 3 Planet symbols 651-653. When processor 204 determines that a 3 or more Planet symbol award has occurred, the processor 204 conducts a random determination using RNG 212 to determine whether to the trigger the Star Sign feature or the Cosmic Climb feature. In this example, the random determination is configured so that there is an equal probability of either feature being triggered. This is graphically represented in screen display 700 by a two-sided coin 710 spinning on display 240 with one side of the coin having the message "Star Sign Feature" (as can be seen in FIG. 7) and "Cosmic Climb Feature" on the other side. In other examples, the relative probabilities of the features being triggered may be weighted. That is, for either feature to be triggered, two conditions need to be met: (i) that a 3 or more Planet win occurs; and (ii) that the result of the random determination is that the selection of the relevant feature. Once one of the features is awarded, a feature award message 810 is displayed as shown in example screen display 800 of FIG. 8, which in this example corresponds to award of the Cosmic Climb feature, with message 810 stating "You won the Cosmic Climb feature. Press Play to start feature".

Similarly, feature game message 642 indicates that a "3 or more [UFO symbol] win awards the UFO . . . Feature".

It will be appreciated that in other examples, all of the feature games could have entirely separate trigger conditions or all of the features could potentially be triggered from a same combination of trigger symbols followed by a random determination. It will also be appreciated that there could be different numbers of feature games.

Figure 5A:
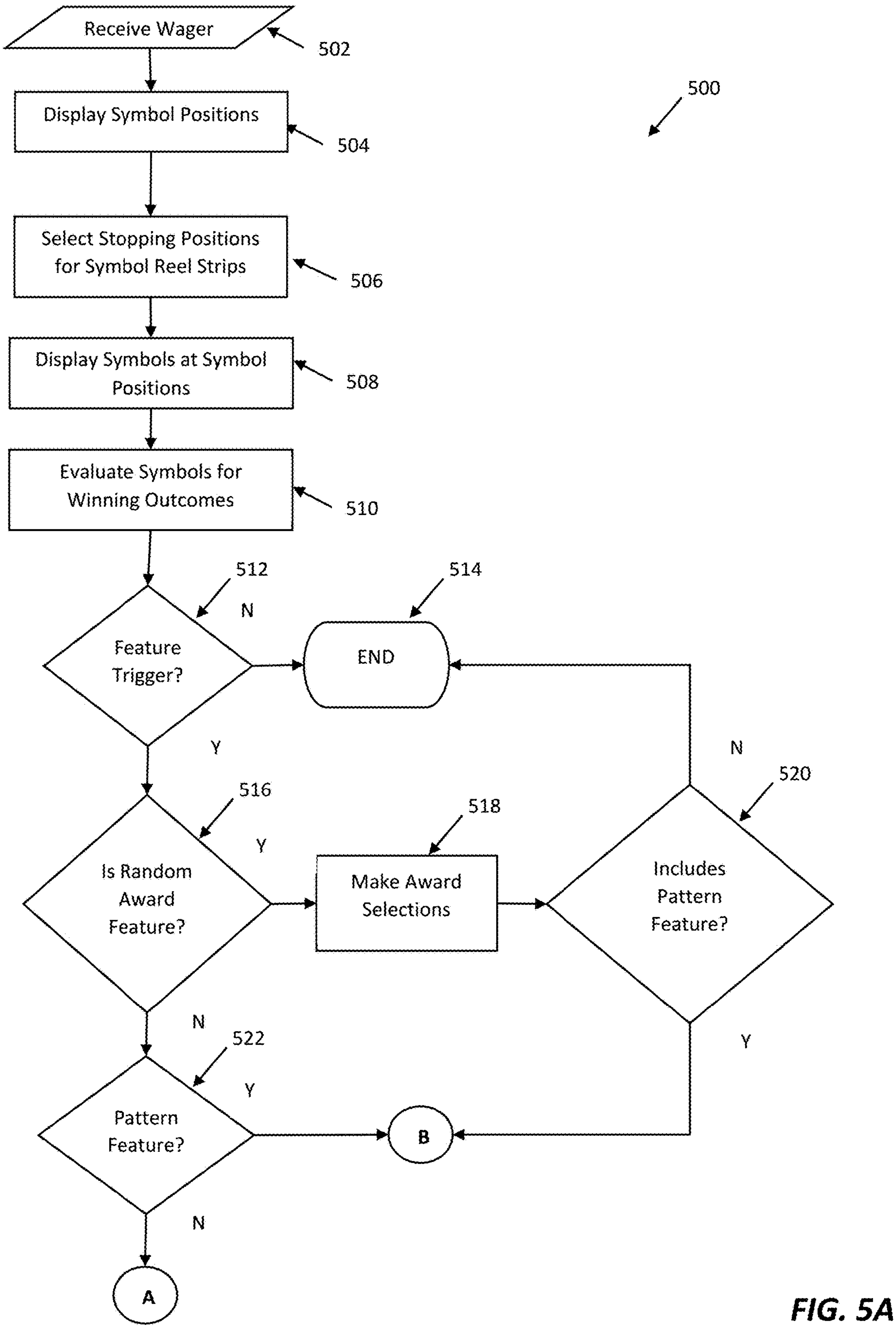
FIG. 5A to 5D show a flow chart of a method of operating a gaming device.
Figure 5B:
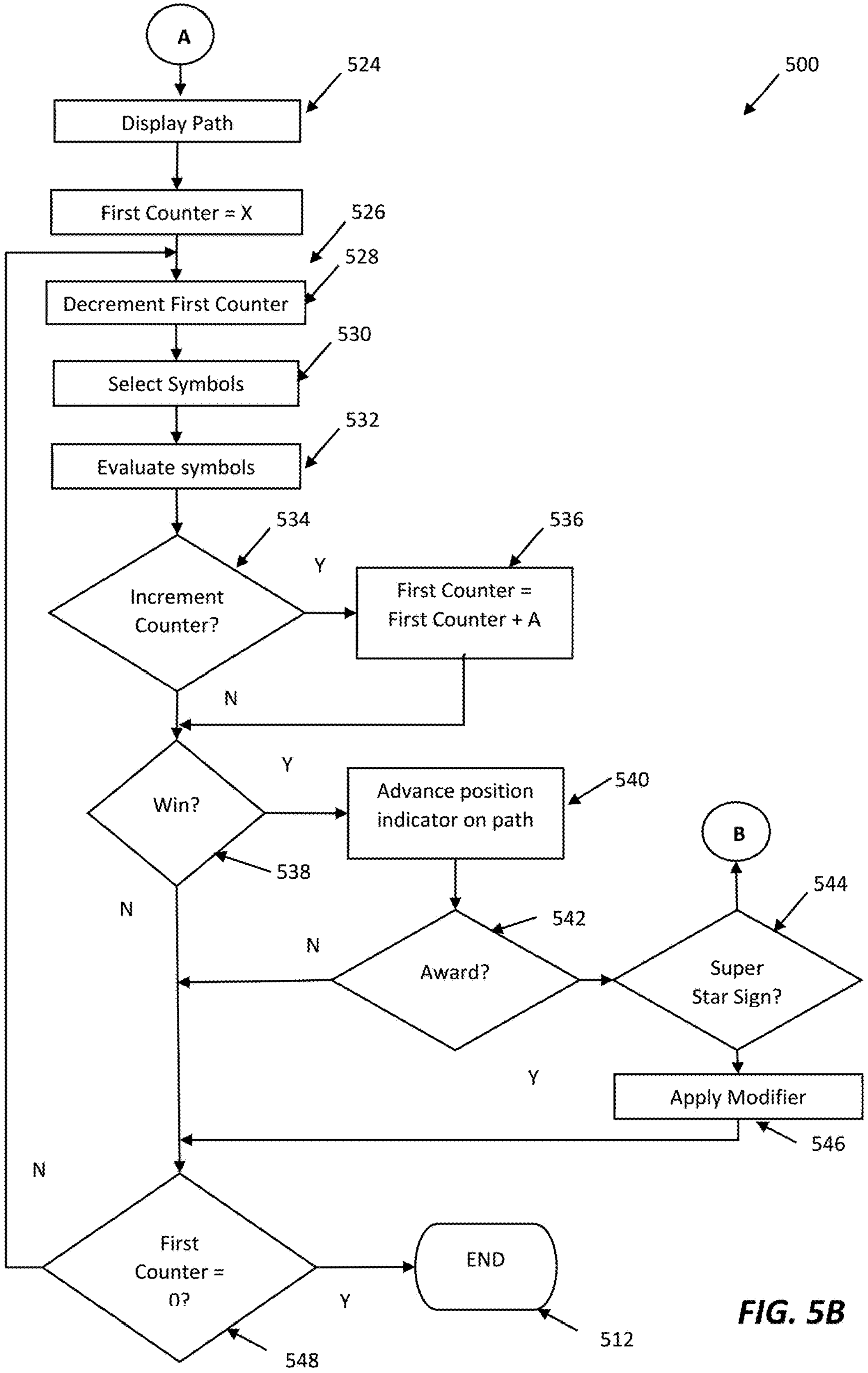
Figure 5C:
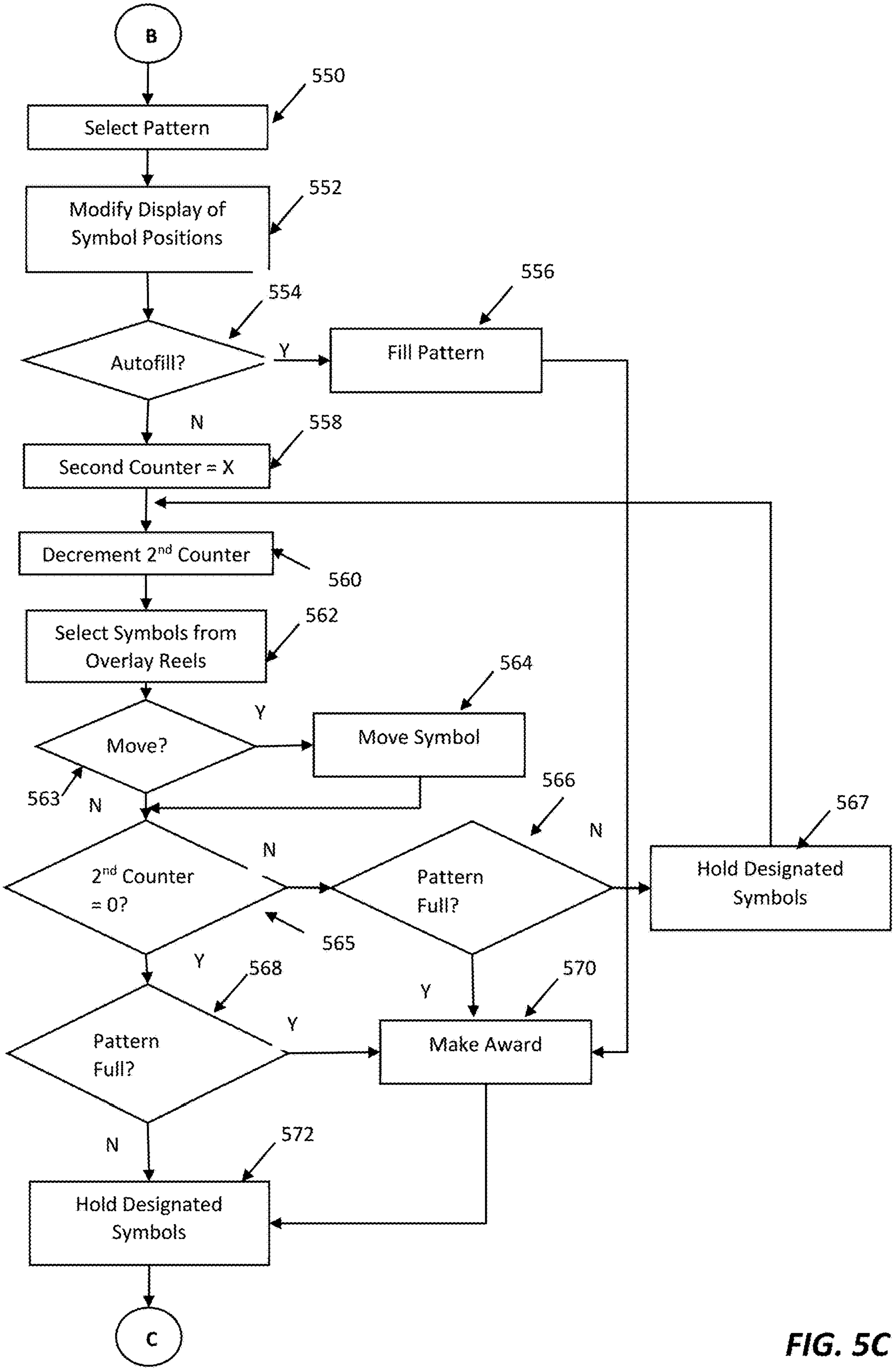
Figure 5D:
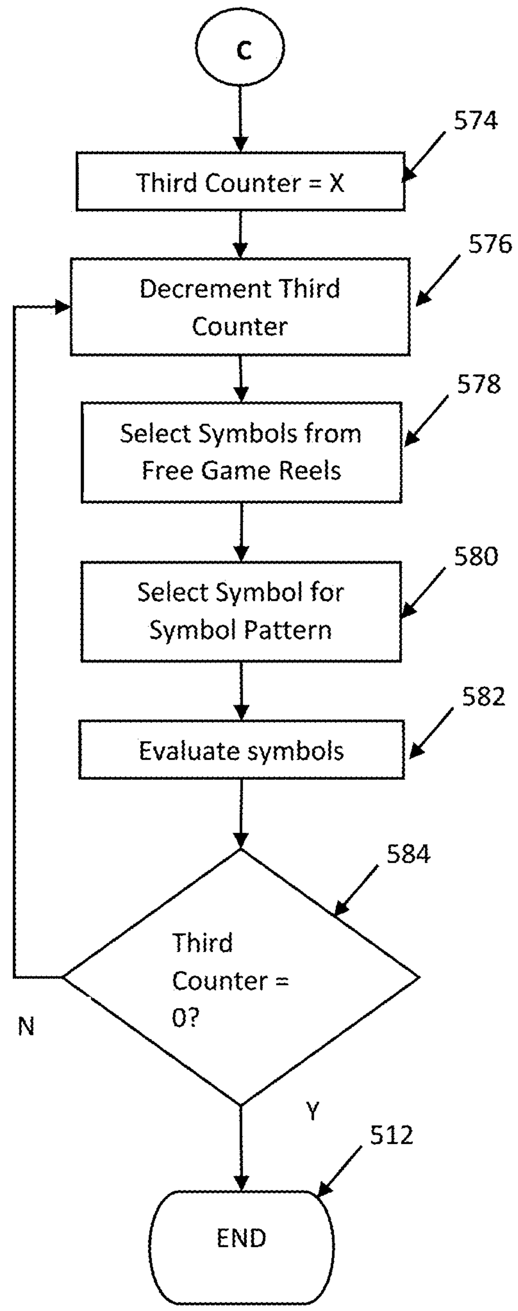
Figure 21:
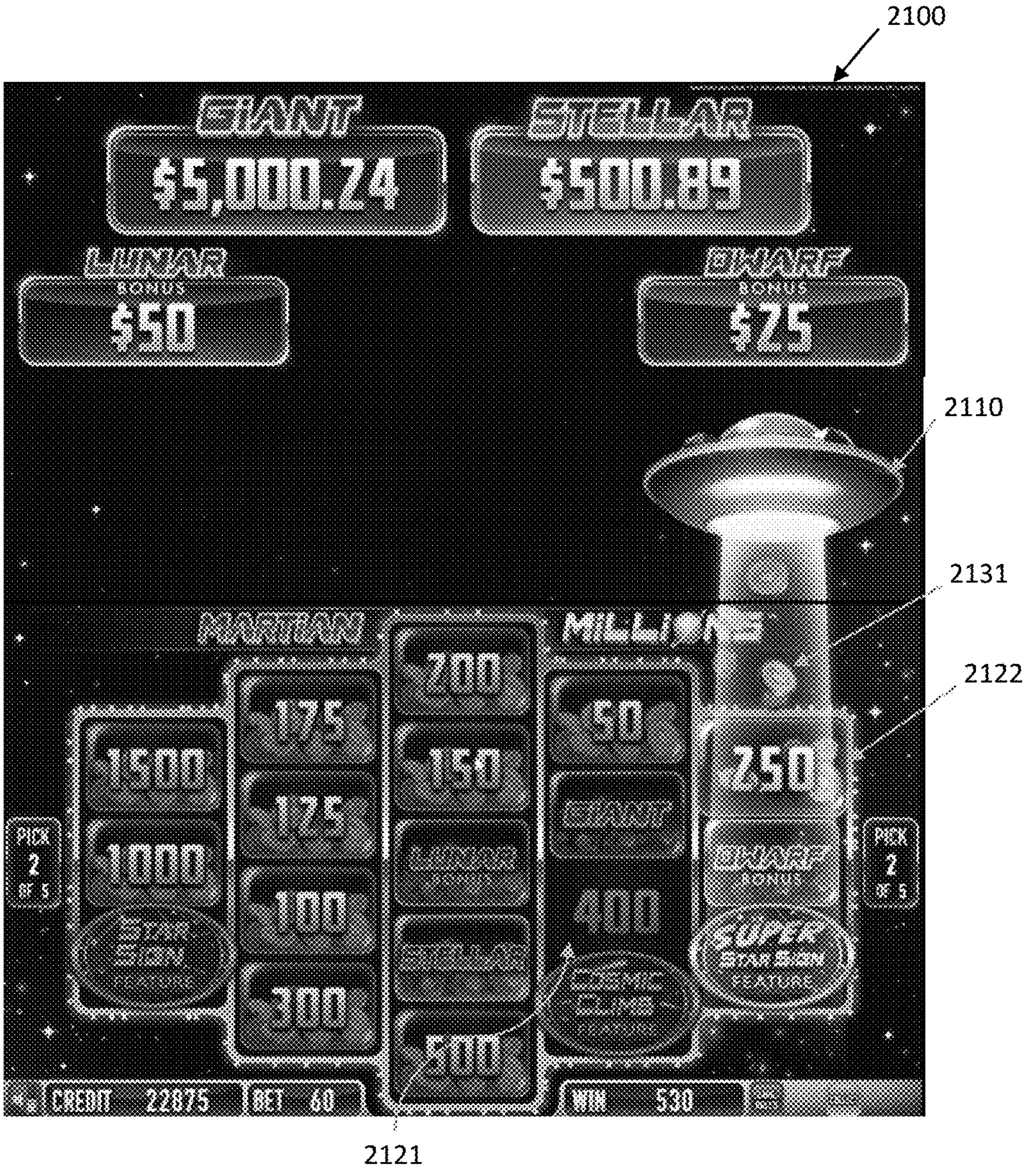
Figure 22:
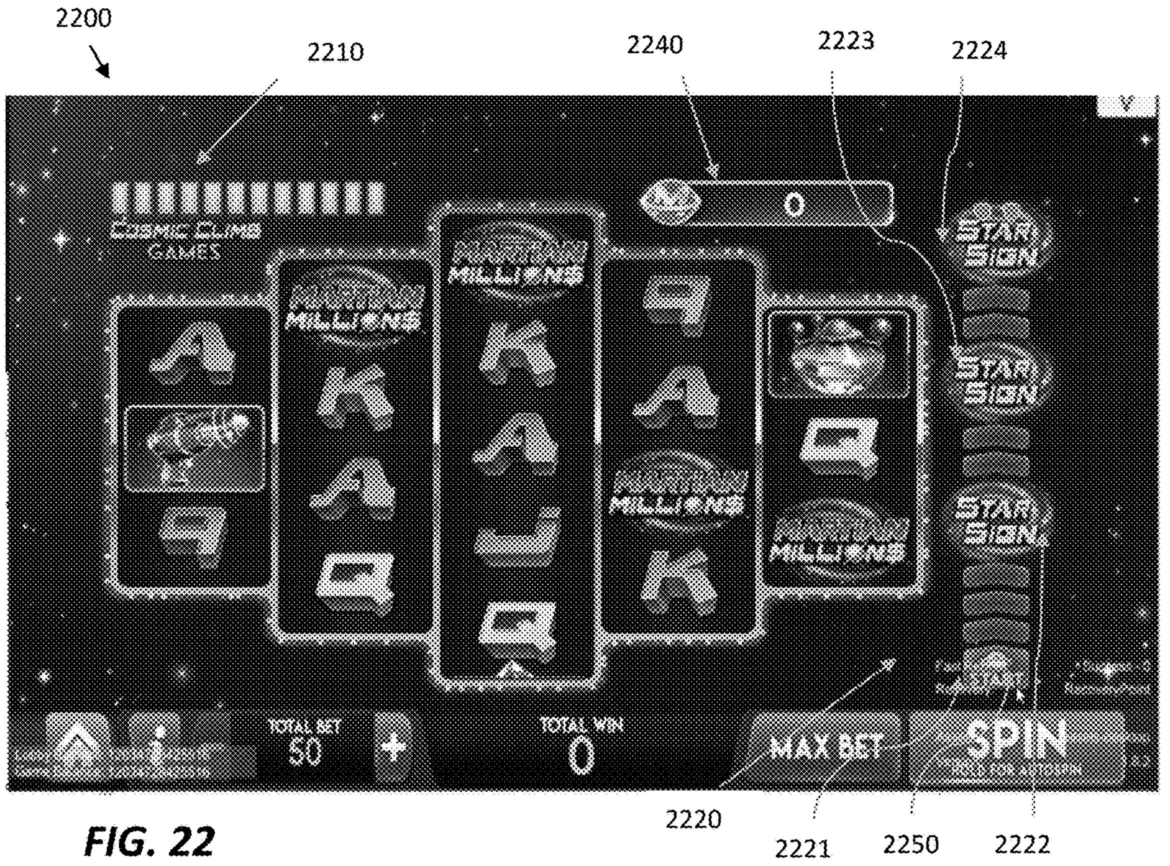

As shown in FIG. 5A, if at step 512 processor 204 determines there is no feature trigger, the game instance ends at step 514. In the case where there is a feature trigger and processor 204 determines 516 that the trigger is a random award feature, processor 204 proceeds to step 518 and makes five award selections from a set of prize awards which include a credit amounts, bonus or jackpot awards 630, and awards of the pattern feature (Star Sign feature). The processor 204 makes the selections using a weighted table stored in memory 208 and RNG 212. Where only credit awards are made, the game instance ends. Where processor 204 determines at step 520 the pattern feature is awarded, processor 204 proceeds to conduct the pattern feature. As indicated by connector B, description of this process continues in FIG. 5C at step 550. FIG. 21 shows an example screen display 2100 of a random prize award feature. In order to indicate the awards made by the processor 204, a UFO graphic 2110 is animated as moving relative to symbol positions having awardable prizes. Screen display 2100 shows a 250 credit prize 2122 being awarded with coins 2131 being animated as moving from credit prize 2122 to UFO 2131. Screen display 2100 also shows a 400 credit prize 2121 that has already been awarded with display of the prize having been modified by removal of the coins behind the credit value as well as the border around the prize.

At step 522, processor 204 determines whether the Pattern Feature trigger occurred and, if so proceeds to step 550. Alternatively, processor 204 will have determined that the Cosmic Climb feature has been triggered and as indicated by connector A, description of this process continues in FIG. 5B at step 524.

In this respect, a step 524, processor 204 controls the display to produce an example screen display in which an award path 910 is displayed above the columns of symbol positions 621-623. Award path has a start position 911 and fifteen progression indicating tiles ending with finish tile 926 which if reached results in an award of a "Super Star Sign Feature". In the Cosmic Climb feature a number of game instances are conducted and each time a winning outcome occurs in a game instance, the processor 204 controls the display so that a UFO themed position indicator 931 is advanced by one tile and any award corresponding to that tile is applied for all future game instances of the Cosmic Climb Feature. The start tiles 911 is the initial location of position indicator 931. Screen display 900 shows an example where a winning outcome has occurred in a first game instance and hence position indicator 931 has been advanced to second tile 912 which corresponds to the award of "+1 Wild" for subsequent game instances. In such game instance, a Wild symbol, here in the form of an Alien symbol is added to one of the symbol positions of the middle column 623 as exemplified below.

In order to conduct the game instances, processor 204 sets a first counter to an awarded number of game instances at step 526, in this example, to ten game instances. In this respect, it will be observed that with an award of ten game instances, it is not possible to obtain fifteen winning outcomes within the initial number of game instances and reach end tile 926. However, additional game instances may be awarded during the game instances, resulting in first counter being incremented. Specifically, an additional ten game instances are awarded by processor 204 for a game outcome with three or more left to right Planet symbols and an additional two game instances are awarded for two left to right Planet symbols.

At step 528, processor 204 decrements the counter by one to reflect the initiation of a game instance. (Note that the same effect can be achieved by counting up towards an end number of game instances.)

At step 530, the processor 204 selects symbols from reel strips in memory 208 using the process described above in relation to FIGS. 3 and 4. In an example, the Cosmic Climb feature reel strips are the same as those used in the base game. In another example, the reel strips have the same symbols but differ in composition, for example, numbers of certain symbols, length of reel strips etc.

At step 532, the processor 204 evaluates the symbols of the current game outcome using a ways to win evaluation as described above and adds any winning amounts to a win meter stored in memory 208.

At step 534, the processor determines whether the game outcome includes a two or more Planet symbol win and hence whether to increment the first counter by the relevant number of game instances. Upon making a positive determination at step 534, processor 204 proceeds to step 536 and increments the counter by either ten or two game instances depending on the number of Planet symbols.

At step 538, processor 204 determines whether the current game instances included one or more winning outcomes, and if so, control the display 204 to show an advance of position indicator 931 along the path defined by the sequence of tiles to the next tile. At step 542, processor 204 determines whether the relevant tile is associated with an award. Unless processor 204 determines that the award is the Super Star Sign Feature at step 544, the award will be of a modifier, and processor applies the modifier at step 546. Processor 204 then determines whether all the game instances have been conducted at step 546, and if not, reverts to step 528. When all game instances have been conducted without the Super Star Sign Feature being awarded, the process ends 512. When the Super Sign Feature is awarded (i.e. the last tile 926 is reached), processing continues at step 550.

Figure 10:
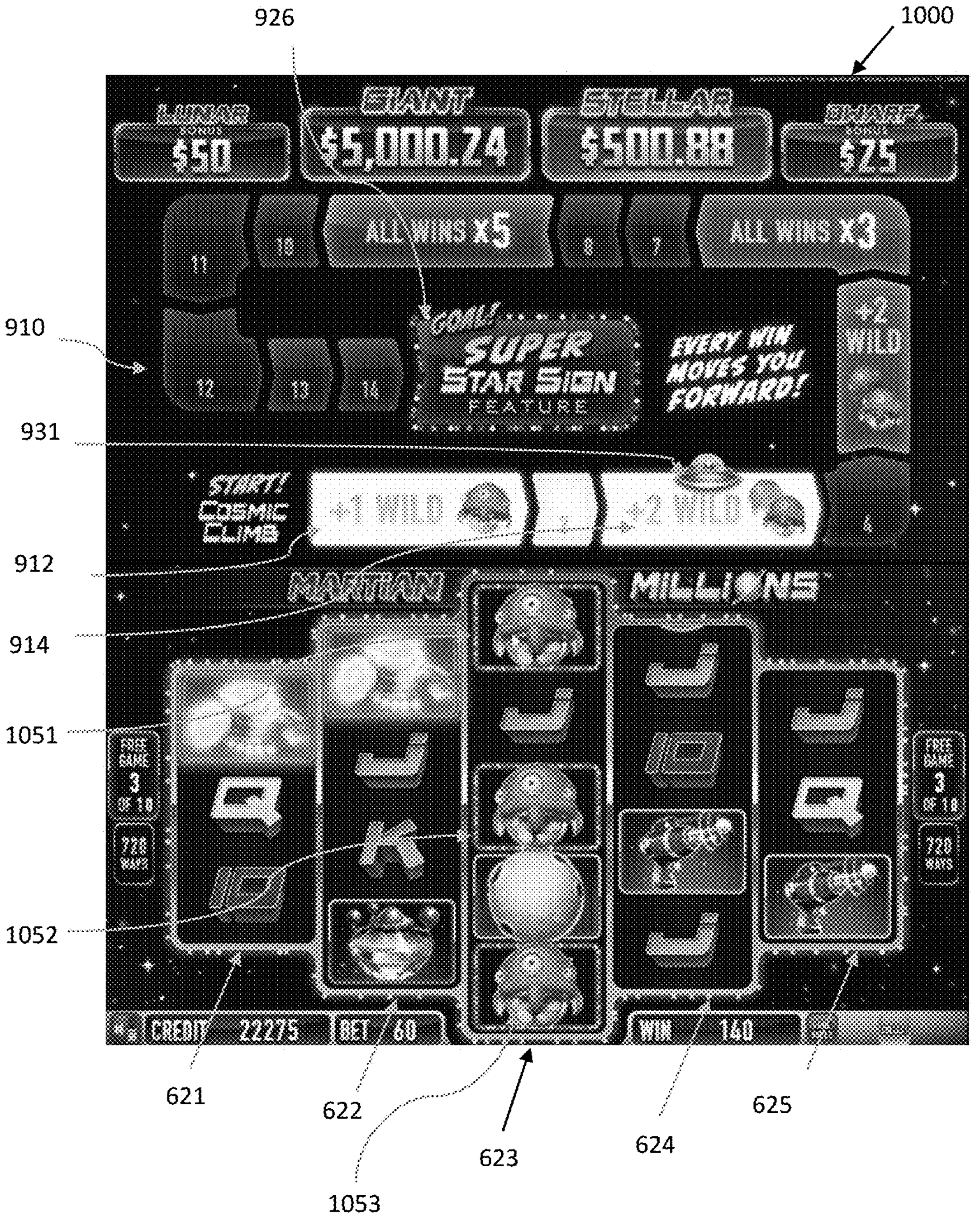
Figure 11:
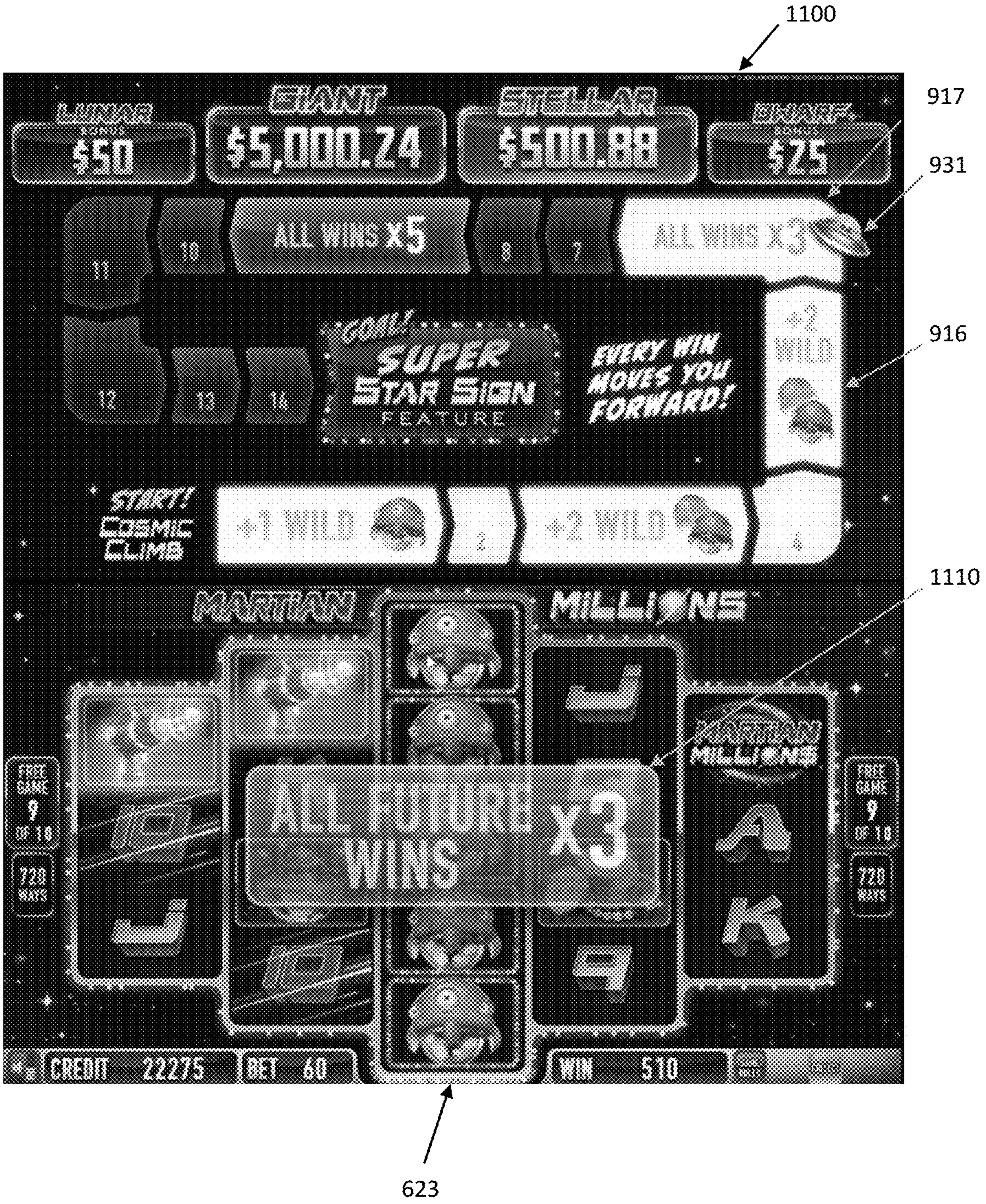

FIGS. 10 and 11 are example screen displays 1000, 1100 showing the award of multipliers. In the example of screen display 1000, progress indicator 931 has been moved to third tile 914 after a third game instance (i.e. there have been three wins), such that at this stage, processor 204 has made an award of the modifier of +1 Wild from first tile, and +2 Wild from third tile 914. As a result, processor 204 has controlled the display 240 so that three Wild [Alien] symbols 1051-1053 are added and will be held in place for all subsequent game instances.

Screen display 1100 shows a case where progress indicator 931 has been moved to the sixth tile 917 following a ninth game instance resulting in the application of an award of all future wins being multiplied by three as indicated by game message 1110 "All Future Wins ×3". It will also be observer that all the symbol positions of middle column 623 are now occupied by Wild [Alien] symbols as a result of the indicator 931 having previously reached fifth tile 916.

As indicated above, step 550 can follow on from (i) a positive determination at step 522 that a pattern feature is awarded by a feature trigger 512, (ii) a positive determination at step 520 that one of the random award selections is a pattern feature, or (iii) the indicator 931 reaching the last tile 926 on path 910 resulting in the processor 204 making an award of the "Super Star Sign" version of the pattern feature.

Figure 12:
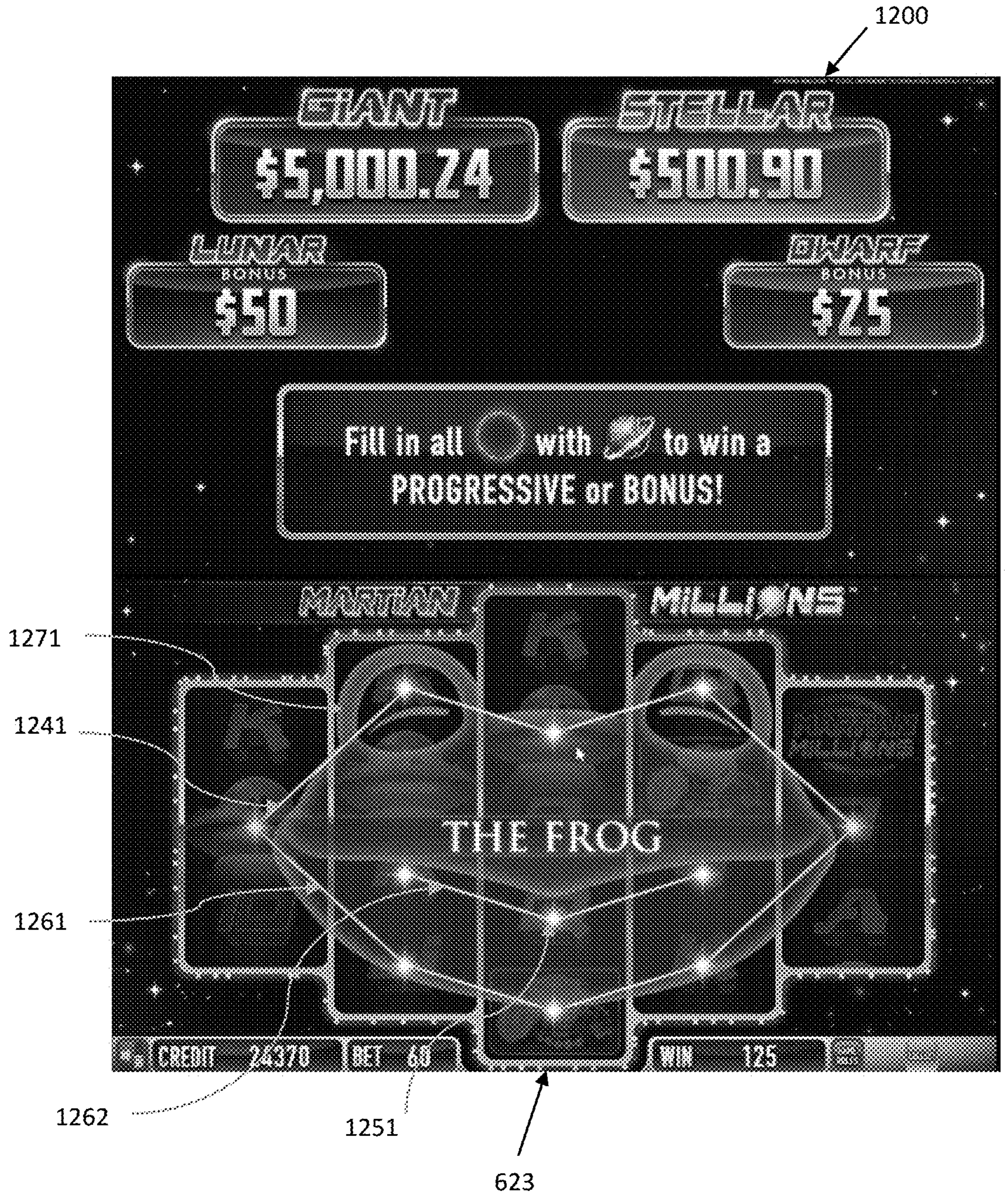
Figure 18:
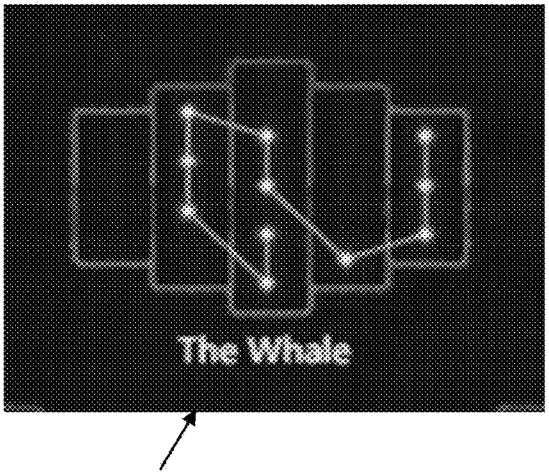
FIG. 18 shows examples of symbol position patterns.
Figure 18:
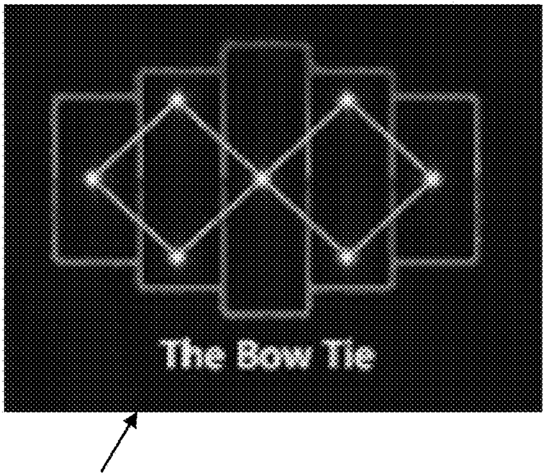
Figure 18:
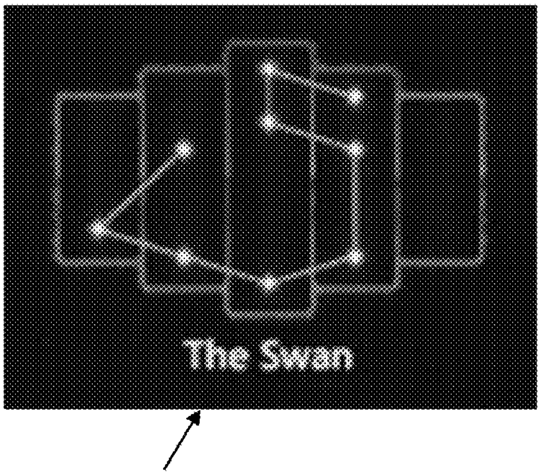
Figure 18:
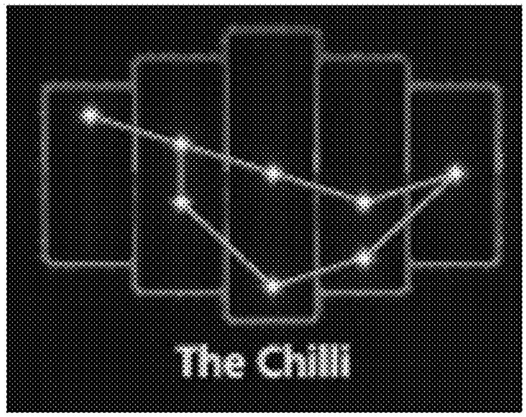
Figure 18:
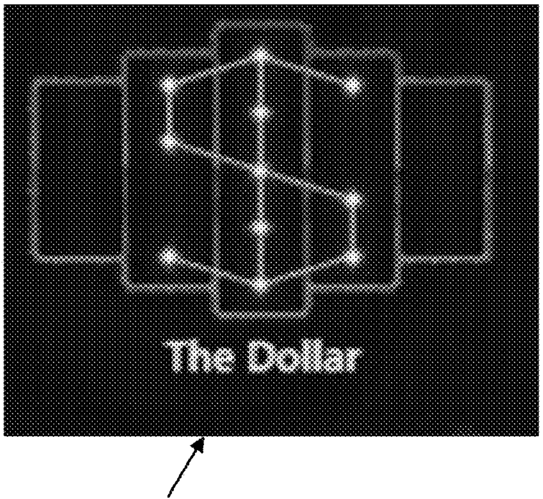
Figure 18:
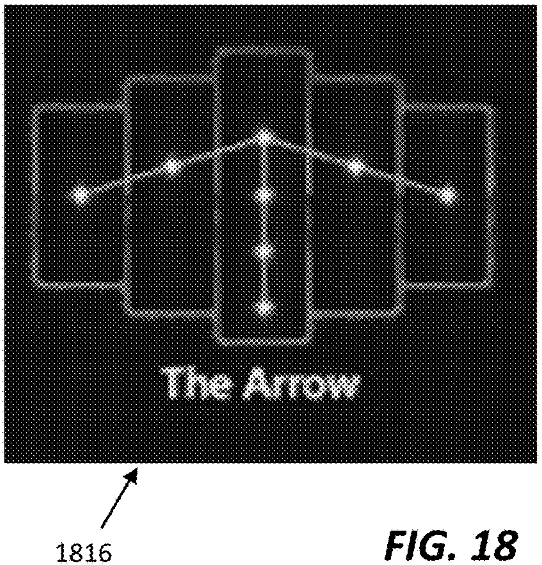

At step 550, processor 204 performs a selection operation to select a random selection of a symbol position pattern from a set of symbol position patterns stored in a symbol position pattern store in memory 208 using RNG 212 and a weighted table stored in memory that determines the relative probability of individual symbol patterns being selected. The symbol position pattern store comprises one or more data structures stored in memory and/or storage and comprising a plurality of symbol position patterns for selection. FIG. 12 shows an example screen display 1200 of an awarded symbol position pattern 1241. The symbol position patterns of the embodiments are themed as constellations and the symbol position pattern shown in FIG. 12 is referred to as "The Frog". In this respect, the symbol positions that make up The Frog constellation are initially represents as stars when overlayed on the display of symbol position. For example, star 1251 indicates that the second bottom symbol position of the third column 623 forms part of the constellation and hence the symbol pattern. Lines such as lines 1261 and 1262 join the start and a constellation graphic 1271 corresponds to the theme of the constellation, such that in this case, constellation graphic is in the form of a frog. The other symbol position patterns of the set of available symbol position patterns are shown in FIG. 18 and these are "The Whale" 1811, "The Bow Tie" 1812, "The Swan" 1813, "The Chili" 1814, "The Dollar", and "The Arrow". Some of the symbol positions patterns have different numbers of symbol positions and/or symbol positions in different number of columns, both of which will affect the impact they have when selected. In this example, The Frog 1241, The Whale 1811, and The Dollar 1815 symbol position patterns have eleven symbol positions; The Swan 1813 symbol position pattern has nine symbol positions; The Chili 1814 and The Arrow 1816 have eight symbol positions; and The Bow Tie 1812 symbol position pattern has seven symbol positions. Also in this example, The Frog 1241, The Bow Tie 1812, The Chili 1814 and The Arrow 1816 have symbol positions in all five columns; The Whale 1811 and The Swan 1813 have symbol positions in four columns; and The Dollar 1815 has symbol positions in three columns.

Figure 13:
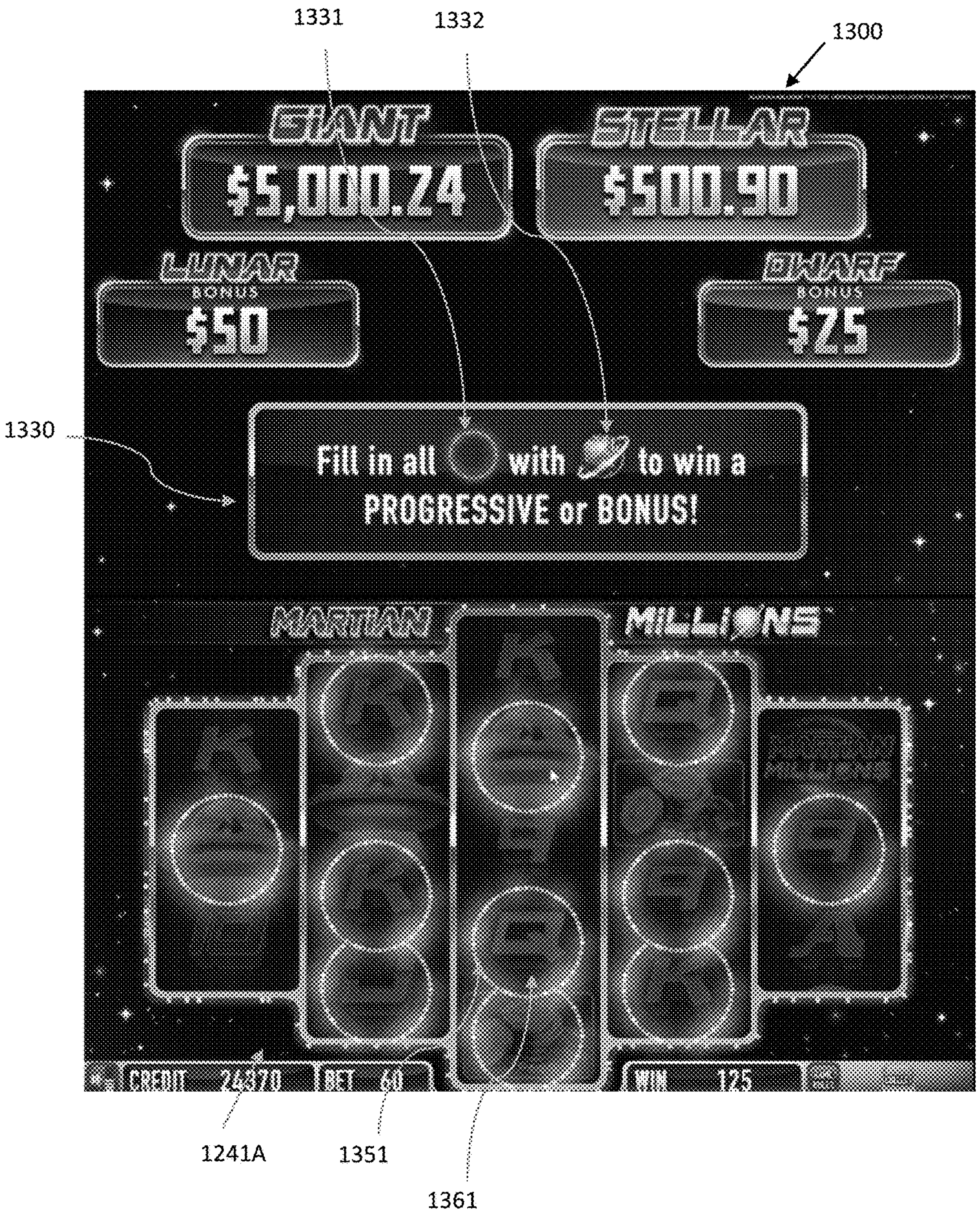

At step 552, the processor 204 controls the display 240 to modify display of the symbol positions in order to show the symbol position pattern. FIG. 13 is an example screen display 1300 showing an example of such a modified display in which the star sign representation of The Frog symbol pattern 1241 has been modified to a circular target representation of The Frog symbol position pattern 1241A for The Frog. In this respect, all of the symbol positions previously denoted by stars now have circular targets which are overlayed on greyed out symbols. For example, circular target 1351 is overlayed on greyed-out Queen symbol 1361 and corresponds to the symbol position previously indicated by star 1251. Game message 1330 indicates the goal is to "Fill in all [Circular Targets 1331] with [Planet symbols 1332] to win a Progressive or Bonus!". That is, the aim is to fill all the positions of the symbol position pattern 1241A with a designated symbol in the form of Planet symbol 1332.

At step 554, processor 204 determines whether to automatically fill the selected symbol pattern which the processor 204 will do in response to the Super Star Sign feature being awarded from the Cosmic Climb feature when fifteenth tile 926 was reached or as one of award selections at step 518. If not, processor 204 proceeds to conduct a plurality of symbol selection instances from a set of overlay reel strips stored in memory 208. Overlay reel strips differ from the reel strips 341-345 in that they have only instances of the Planet symbol 1332 or blank symbol positions. They are referred to overlay reel strips because they are displayed as spinning in superimposed relation to greyed-out symbols at the symbol positions in the same way that target 1351 is superimposed on Queen symbol 1361. The blank symbols on the reel strips allow the underlying greyed-out symbols to be seen whereas the Planet symbols are superimposed as will be apparent from FIGS. 14 to 16.

In order to conduct the plurality of symbol selection instances, at step 558, processor 204 sets a second counter to the number of symbol selection instances, in this example to three selection instances. In an example, the number of symbol selection instances is fixed. In another example, the number of symbol selection is variable, for example, by being reset each time a designated symbol is selected for a symbol position of the symbol pattern. At step 560, processor 204 decrements the second counter by one to reflect the conduct of a symbol selection instance and, at step 562, processor 204 selects symbols from the overlay reel strip by selecting stopping positions and mapping symbols based on the selected stopping positions using a process as exemplified in relation to FIG. 4.

Figure 14:

FIG. 14 is an example screen display 1400 following an instance in which symbol selection has been conducted at step 562 and symbol pattern 1241A has been part-filled by designated symbols. For example, symbol position 1351 is now occupied by a Planet symbol 1451. It will be observed, the selection process conducted by processor 204 can result in designated symbols, such as Planet symbol 1432 being selected at positions that are no part of symbol position pattern 1241A. In an example, if such a Planet symbol satisfies a movement condition it will be moved to a position of the symbol position pattern. In this example, the movement condition is that (i) the designated symbol is within a defined number of symbol positions of an empty target of the symbol position pattern (e.g. one symbol position); and (ii) that, following a random determination using RNG 212 and a weighted table stored in memory 208, processor 204 determines to move the symbol. In this example, the defined number of symbol positions is one.

Figure 15:

Accordingly, at step 563 processor 204 determines whether to move one or more symbols. First, processor 204 determines whether there are any candidate symbols to move. In the case, of FIG. 14, Planet symbol 1432 has been selected at a neighbouring symbol position to empty symbol position 1431 of symbol pattern 1241A. Accordingly, symbol 1432 is a candidate to be moved and processor 204 conducts a random determination to determine whether to move symbol 1432. Example screen display 1500 of FIG. 15 shows an example of a symbol being moved at step 564 the result of a positive determination to move a symbol at step 563. UFO graphic 1510 appears above symbol position 1431 and an animation shows the Planet symbol 1432 being moved by the UFO graphic 1510 to symbol position 1431. In FIG. 15, planet symbol is shown at an intermediary position 1432A nearing completion of the move to symbol position 1431.

At step 565, processor 204 determines whether the second counter has reached zero (that is whether all game instances have been conducted). If not, processor 204 proceeds to step 566 and determines whether the pattern is full (that is, have designated symbols been selected for all symbol positions of the symbol position pattern). If the pattern is not full, processor 204 holds all of the designated symbols in place at step 567 and proceeds to begin a further symbol selection instance at step 560.

After all of the game instances have been conducted, processor 204 proceeds to step 568 and determines whether the symbol position pattern 1241A is full. An example, of symbol positions of symbol position pattern 1241A being filled is shown in example screen display 1600 of FIG. 16. Processor 204 can also proceed to step 570 and make an award upon it being determined at step 566 that the pattern is full. In examples, where selection of a designated symbol at a symbol position of a symbol position pattern results in the game instance counter being reset, step 568 is not needed as the counter will be non-zero at step 565 and the processor 204 will proceed to step 566. It will be appreciated that in the above example, there are two possible end conditions for the game instances being conducted: the pattern being filled; and the counter reaching zero.

Figure 16:
Figure 17:
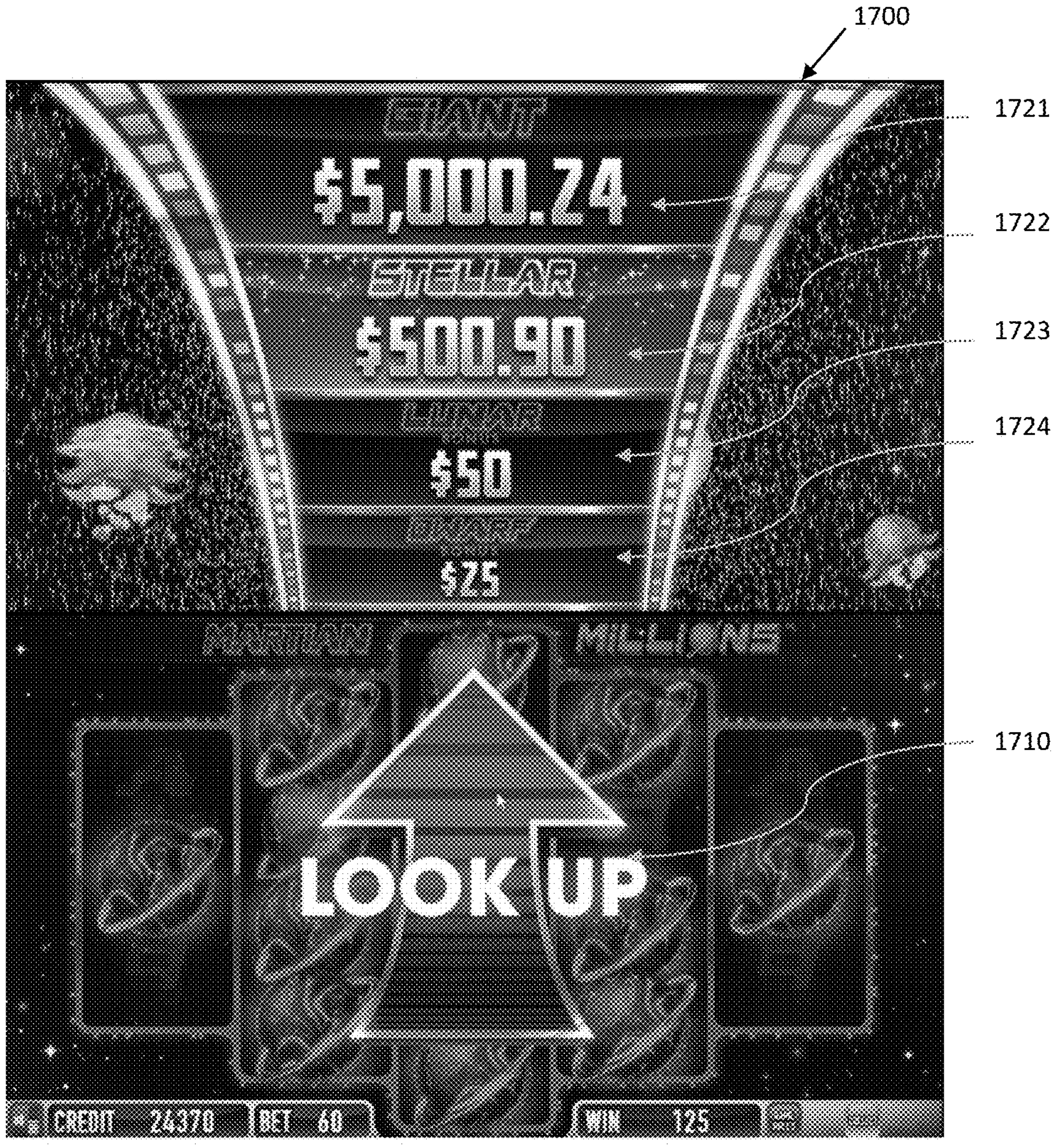

Upon the symbol position pattern being full as shown in FIG. 16, processor 204 proceeds to step 570 and makes an award. In an example, processor 204 makes an award by randomly selecting an award from a set of awards using RNG 212 and a weighted table stored in memory 208. Example screen display 1700 shows an animation of an award process. Game message 1710 advises a player to "Look Up" and observe a prize indication moving relative to prize graphic 1721-1724. Here the prize indication is that the prize graphic that is currently selected is lit up. In this case, Stellar progressive prize graphic 1722 is highlighted relative to Giant progressive prize graphic 1721, Lunar bonus prize graphic 1723, and Dwarf bonus prize graphic 1724 to indicate that Stellar progressive having a value of $500.90 has been awarded at step 570.

At indicated above, in some circumstances, a Super Star Sign feature is awarded such that processor 204 will make a positive determination to automatically fill the symbol position pattern at step 554 and proceed to fill the pattern at step 556. The processor 204 can animate filling of the symbol position pattern in a number of ways including by conducting one or more animations of a symbol section instance that results in all of the positions being filled. Processor 204 then proceeds to step 570 and makes an award.

Irrespective of whether processor 204 makes an award at step 570, processor 204 holds the designated (Planet) symbols at step 572 for subsequent processing in a second phase of the Star Sign Feature in which a further series of game instances are conducted ("free games"). In this phase, symbols are selected from free game reel strips which, in one example, may be the similar to the base game reel strips but with the Wild or Scatter symbols removed.

At step 574, processor 204 sets a counter to the number of games instances, e.g. to 5. At step 576, processor 204 decrements the counter to reflect the conduct of one of the game instance.

Figure 19:
FIGS. 19 to 25 are further example screen displays.

At step 578, processor 204 selects symbols from the free game reel strips using the same process described in relation to FIGS. 3 and 4. FIG. 19 shows an example of a screen display 1900 after such a selection process. In this respect, in this example, a completed symbol pattern 1241B is displayed with Planet symbols at all of the symbol positions of the pattern. In examples, where the pattern is not completely filled, the Planet symbols are still held but symbols are selected from free game reel strips for the positions of the symbol positions pattern not occupied by the Planet symbol. It will be observed that unlike Queen symbol 1361 in FIG. 13, the selected symbols such as Queen symbol 1911 are not-greyed out.

Figure 20:

At step 580 processor 204 selects a symbol for all symbol positions of the symbol pattern 1241B that are occupied by the designated symbol (here the Planet symbol) from a set of symbols, which in this example, is the same as the set of symbols on the free game reel strips. In an example, processor 204 selects the symbol using RNG 212 and a weight table stored in memory 208. An example screen display 2000 following such a selection is shown in FIG. 20, wherein Queen symbol has been selected for display at all symbol positions of symbol pattern 1241B. In examples, where the pattern is not completely filled.

At step 582, processor 204 evaluates the symbols for winning outcomes based on pay table in memory 208 and adds any award to the win meter in memory 208. It will be appreciated that in this example, where there are larger number of symbol positions occupied by the same symbol, there are advantageous prospects of winning combinations of symbols occurring featuring the symbol selected for the symbol pattern.

At step 584, processor 204 determines whether the third counter has reached zero (that is, whether all of the free games have been conducted), and if not reverts to step 576. When all of the free games have been conducted, the game instance ends.

FIGS. 22 to 25 illustrate an alternative aspect where a path 2220 having awards at positions along the path is employed in an alternative manner to the Cosmic Climb Feature described above but which can also result in the award of a Star Sign feature if the end of the path is reached. In this example, processor 204 conducts blocks of game instances (referred to as "Cosmic Climb Games") during which there is a chance to win a bonus prize in addition to the chance of winning prizes from the individual game instances. As shown in example screen display 2200 of FIG. 12 a game indicator 2210 has twelve indicator portions to indicate that the block of game instances comprises twelve game instances. The path has first award tile 2222, second award tile 2223, and third award tile 2224. Before the block of games is started, a progress indicator in the form of a UFO graphic 2250 is placed on a start tile 2221. There are three tiles between the start tile and the first award tile 2222, two tiles between the first award tile 2222 and the second award tile 2223, and two further tiles between second award tile 2223 and third award tile 2224 so that there are ten tile on the path 2220 in addition to start tile 2221. As in the Cosmic Climb feature, a winning outcome in a Cosmic Climb Game results in indicator 2250 being moved along the path 2210. However, unlike the Cosmic Climb feature, in the Cosmic Climb Games, an award is only made if the third award tile 2224 is reached or if the indicator is on the first award tile 2222 or second award tile 2223 when the block of games concludes. That is, awards are not accumulated once tiles are passed.

Prior to the block of games commencing processor 204 determines what awards will occupy the award tiles. In an example, the third award tile 2224 is always determined to have a Star Sign feature as an award. In an example, the processor 204 uses RNG 212 and a weighted table stored in memory 208 to select the awards to occupy the award tiles from a set comprising a 10× multiplier, a 5× multiplier, a 2× multiplier, a 1× multiplier, a 0× multiplier and the Star Sign Feature. In some examples, each award tile 2222-2124 has a different weighted table. Where the awards on award tiles 2222 are positive multipliers, the player is awarded total prize value 2240 (that is the total prize awarded over the block of games) multiplied by the multiplier on the award tile.

Figure 23:
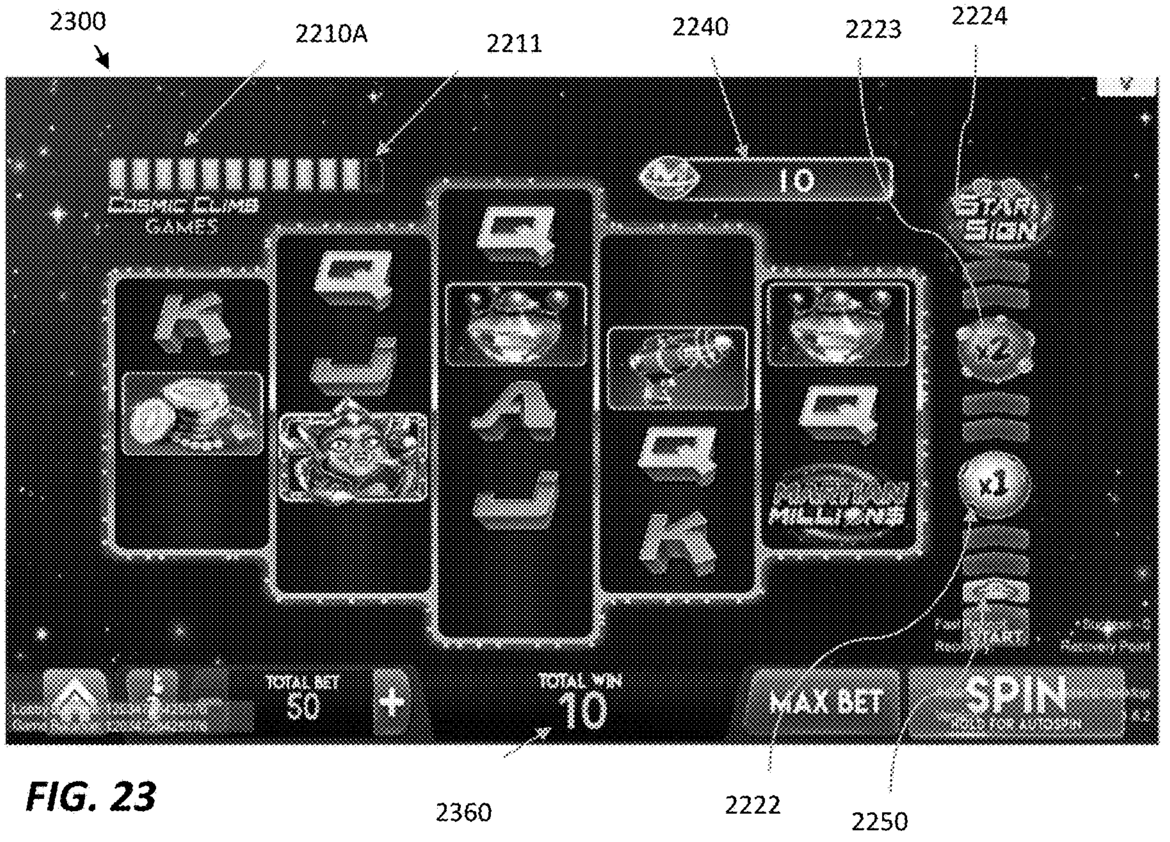

FIG. 23 illustrates an example where the processor 204 has selected a ×1 multiplier for first award tile 2222 and a ×2 multiplier for second award tile 2223. In the example screen display 2300 of FIG. 22, processor 204 has conducted a first game instance which is winning outcome of 10 credits as indicated by win meter 2360. Accordingly, processor 204 has modified the display 240 by moving the progress indicator 2250 along path 2220 to a first tile immediately above start tile 2221. Processor 20 has also controlled the display 240 to show a modified game indicator 2210A where one of the indicating portions 2211 is greyed-out to indicate one game of the block of games has been conducted and that eleven game instances remain. In FIG. 23, total prize value 2240 is 10 credits corresponding to the amount won in first game instance.

Figure 24:
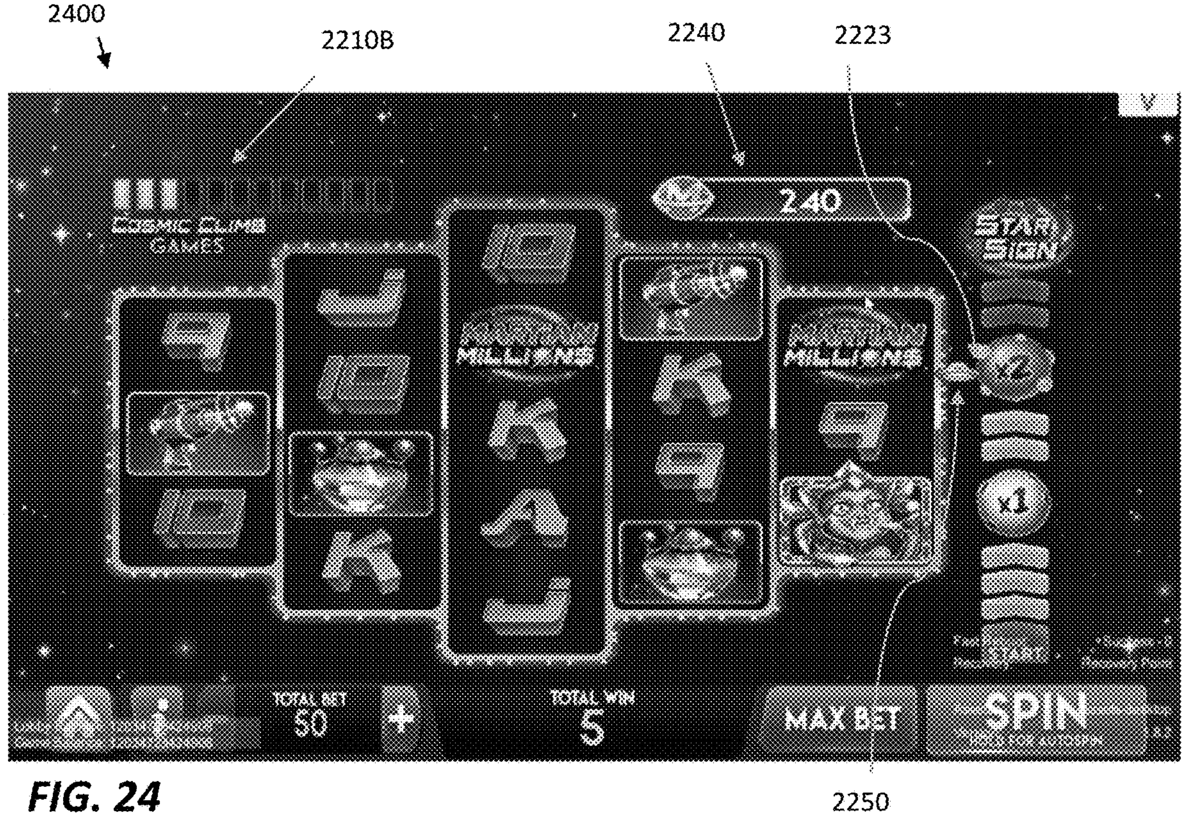

FIG. 24 is an example screen display 2400 later in the block of game instances. At this modified game indicator 2210B shows three game instances remaining. Progress indicator 2250 has moved to the seventh tile, here the second award tile 2223. It will be observer that at this point in play if there are no more winning outcomes in individual games, the processor 204 will make a bonus award of the current total prize value of 240 credits; if there are one or two winning outcomes in the last three game instances, there will be no bonus award; and if there are three winning outcomes, there will be a bonus award of the Star Sign Feature which is conducted as described above in relation to FIG. 5. Advantageously, this creates balance, particularly towards the end of the block of games, between benefits of achieving additional wining outcomes in individual games and benefits of receiving a bonus award.

Figure 25:
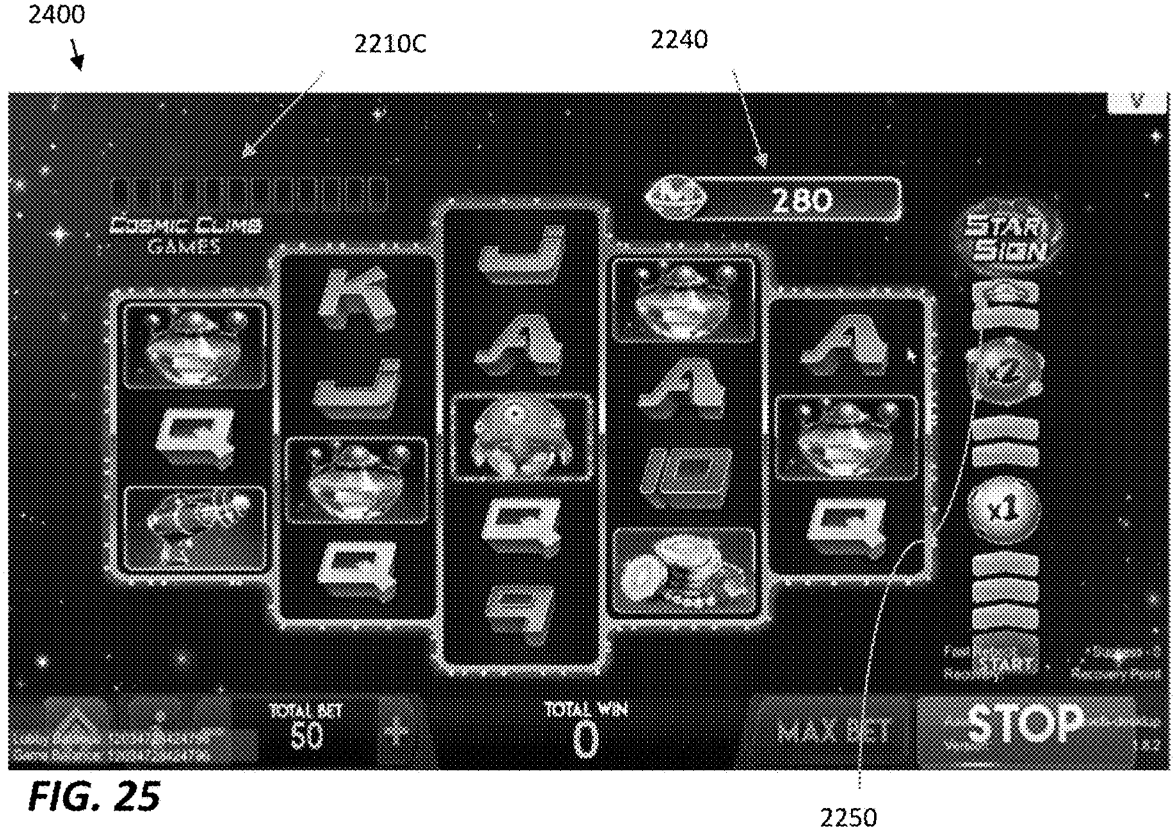

FIG. 25 is an example screen display 2500 after the last game instance of a current block of game instances has been conducted as indicated by modified game indicator 2210C. In this example, the second and third last game instances were winning outcomes resulting in progress indicator 2250 moving to ninth tile immediately below third award tile 2224. As a result, no bonus award is made by processor 204.

Subsequent to the end of the block of game instances, processor 204 starts a new block of game instances by selecting new award for the award tiles and resetting game progress indicator.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a display;

a random number generator;

at least one input mechanism;

a processor; and a computer readable storage medium comprising instructions which, when executed by the processor, cause the processor to:

control the display to display a plurality of symbol positions defined by symbol position data;

perform a selection operation using the random number generator and a data structure comprising a plurality of symbol position patterns to obtain one of the symbol position patterns;

modify display of the plurality of symbol positions in accordance with the selected symbol position pattern;

perform a symbol selection instance using a plurality of reel strips, wherein the plurality of reel strips comprise a designated symbol, with respect to the plurality of symbol positions until an end condition is met;

upon all the symbol positions of the selected symbol position pattern being occupied by the designated symbol when the end condition is met, determine an outcome;

conduct symbol selection until the end condition is met by conducting a plurality of symbol selection instances using the plurality of reel strips comprising a designated symbol in which any designated symbol selected for a symbol position of the selected symbol position pattern is held in place for any subsequent instance of the symbol selection instances such that designated symbols accumulate over the plurality of symbol selection games instances; and upon determining a symbol selection instance results in a designated symbol being selected for a symbol position that does not form part of the selected symbol, determine whether the designated symbol selected for a symbol position that does not form part of the selected symbol pattern satisfies a movement condition, and upon the designated symbol satisfying the movement condition, moving the designated symbol to a symbol position of the selected symbol pattern.

2. The gaming device of claim 1, wherein at least two of the symbol position patterns of the plurality of symbol position patterns comprise different numbers of symbol positions.

3. The gaming device of claim 1, wherein the computer readable medium comprises symbol data defining a plurality of base game reel strips, and wherein the instructions further cause the processor to:

generate a base game outcome by selecting symbols from the base game reel strips for the plurality of symbol positions;

control the display to display the selected symbols of the base game outcome; and determine whether the base game outcome satisfies a trigger condition as a pre-condition for selecting one of the symbol patterns.

4. The gaming device of claim 3, wherein the trigger condition comprises at least a threshold number of a trigger symbol being included in the base game outcome.

5. The gaming device of claim 3, wherein the trigger condition comprises (i) at least a threshold number of a trigger symbol being included in the base game outcome and (ii) the result of the processor using the random number generator to select between at least two game events being a selection of the game event of selecting one of the symbol patterns.

6. The gaming device of claim 1, further comprising instructions that cause the processor to, subsequent to conducting symbol selection from the plurality of reel strips comprising a designated symbol until the end condition is met, conduct at least one additional gaming instance comprising determining a symbol to occupy the symbol positions of the selected symbol position pattern occupied by the designated symbol when the end condition is met independently of selecting symbol positions for other symbol positions that do not form part of the symbol position pattern.

7. The gaming device of claim 6, further comprising instructions that cause the processor to determine the symbol to occupy the symbol positions of the selected symbol position pattern by using the random number generator to select the symbol from a set of symbols.

8. A method comprising:

controlling a display to display a plurality of symbol positions defined by symbol position data;

performing a selection operation, using the random number generator and a data structure comprising a plurality of symbol position patterns to obtain one of the plurality of symbol position patterns;

modifying display of the plurality of symbol positions in accordance with the selected symbol position pattern;

performing a symbol selection instance using a lookup table comprising a plurality of reel strips, wherein the plurality of reel strips comprise a designated symbol with respect to the plurality of symbol positions until an end condition is met, wherein performing symbol selection until the end condition is met comprises conducting a plurality of symbol selection instances using the plurality of reel strips comprising a designated symbol in which any designated symbol selected for a symbol position of the selected symbol position pattern is held in place for any subsequent instance of the symbol selection instances such that designated symbols accumulate over the plurality of symbol selection games instances;

upon all the symbol positions of the selected symbol position pattern being occupied by the designated symbol when the end condition is met, determining an outcome; and upon determining a symbol selection instance results in a designated symbol being selected for a symbol position that does not form part of the selected symbol, determining whether the designated symbol selected for a symbol position that does not form part of the selected symbol pattern satisfies a movement condition, and upon the designated symbol satisfying the movement condition, moving the designated symbol to a symbol position of the selected symbol pattern.

9. The method of claim 8, further comprising:

generating a base game outcome by selecting symbols from a plurality of base game reel strips for the plurality of symbol positions;

controlling the display to display the selected symbols of the base game outcome; and determining whether the base game outcome satisfies a trigger condition as a pre-condition for selecting one of the symbol patterns.

10. The method as claimed in claim 9, wherein the trigger condition comprises at least a threshold number of a trigger symbol being included in the base game outcome.

11. The method of claim 8, further comprising subsequent to conducting symbol selection from the plurality of reel strips comprising a designated symbol until the end condition is met, conducting at least one additional gaming instance comprising determining a symbol to occupy the symbol positions of the selected symbol position pattern occupied by the designated symbol when the end condition is met independently of selecting symbol positions for other symbol positions that do not form part of the symbol position pattern.

12. The method of claim 11, further comprising determining the symbol to occupy the symbol positions of the selected symbol position pattern by using the random number generator to select the symbol from a set of symbols.

13. One or more non-transitory computer readable media comprising computer readable code executable by one or more processors to:

perform a selection operation, using the random number generator and a data structure comprising a plurality of symbol position patterns to obtain one of the plurality of symbol position patterns;

perform a symbol selection instance using a lookup table comprising a plurality of reel strips, wherein the plurality of reel strips comprise a designated symbol with respect to the plurality of symbol positions until an end condition is met, wherein performing symbol selection until the end condition is met comprises conducting a plurality of symbol selection instances using the plurality of reel strips comprising a designated symbol in which any designated symbol selected for a symbol position of the selected symbol position pattern is held in place for any subsequent instance of the symbol selection instances such that designated symbols accumulate over the plurality of symbol selection games instances;

upon all the symbol positions of the selected symbol position pattern being occupied by the designated symbol when the end condition is met, determine an outcome; and upon determining a symbol selection instance results in a designated symbol being selected for a symbol position that does not form part of the selected symbol, determining whether the designated symbol selected for a symbol position that does not form part of the selected symbol pattern satisfies a movement condition, and upon the designated symbol satisfying the movement condition, moving the designated symbol to a symbol position of the selected symbol pattern.

14. The one or more non-transitory computer readable media of claim 13, wherein at least two of the symbol position patterns of the plurality of symbol position patterns comprise different numbers of symbol positions.

15. The one or more non-transitory computer readable media of claim 13, further comprising computer readable code to:

generate a base game outcome by selecting symbols from a plurality of base game reel strips for the plurality of symbol positions;

controlling the display to display the selected symbols of the base game outcome; and determining whether the base game outcome satisfies a trigger condition as a pre-condition for selecting one of the symbol patterns.

16. The one or more non-transitory computer readable media of claim 15, wherein the trigger condition comprises at least a threshold number of a trigger symbol being included in the base game outcome.

* * * * *